United States Patent
Iwamoto et al.

(10) Patent No.: US 10,881,937 B2
(45) Date of Patent: Jan. 5, 2021

(54) IMAGE PROCESSING APPARATUS, ANALYSIS SYSTEM, AND METHOD FOR PROCESSING IMAGES

(71) Applicant: CASIO COMPUTER CO., LTD., Tokyo (JP)

(72) Inventors: Kenji Iwamoto, Kokubinji (JP); Osamu Nojima, Hachioji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 254 days.

(21) Appl. No.: 15/793,499

(22) Filed: Oct. 25, 2017

(65) Prior Publication Data
US 2018/0140923 A1 May 24, 2018

(30) Foreign Application Priority Data
Nov. 21, 2016 (JP) .................... 2016-226235

(51) Int. Cl.
*A63B 69/36* (2006.01)
*G09B 19/00* (2006.01)
*G06K 9/00* (2006.01)

(52) U.S. Cl.
CPC .......... *A63B 69/36* (2013.01); *A63B 69/3621* (2020.08); *G06K 9/00342* (2013.01); *G09B 19/0038* (2013.01)

(58) Field of Classification Search
CPC . A63B 69/36; A63B 69/3641; A63B 24/0006; A63B 24/0062; A63B 24/0087;
(Continued)

(56) References Cited

U.S. PATENT DOCUMENTS 7,264,554 B2  9/2007  Bentley
8,616,989 B2* 12/2013  Bentley ............. A63B 69/3608
                                                  473/215
(Continued)

FOREIGN PATENT DOCUMENTS

CN   105641897 A   6/2016
JP   2008528195 A  7/2008
(Continued)

OTHER PUBLICATIONS

Chinese Office Action (and English language translation thereof) dated Apr. 26, 2019 issued in Chinese Application No. 201711133992.5.

(Continued)

*Primary Examiner* — Bobbak Safaipour
(74) *Attorney, Agent, or Firm* — Holtz, Holtz & Volek PC

(57) ABSTRACT

To present a measurement result on the motion of a subject more easily, a processor 3 of an analysis system S includes an image acquisition unit 357, a sensor information acquisition unit 356, an analysis unit 358, and an image creation unit 359. The image acquisition unit 357 acquires a taken image of the subject. The sensor information acquisition unit 356 acquires a measurement result of the motion of the subject measured with a sensor. The analysis unit 358 creates an index indicating the motion of the subject based on the measurement result acquired by the sensor information acquisition unit 356. The image creation unit 359 makes an output unit 319 display an image acquired by the image acquisition unit 357 and an index created by the analysis unit 358 together.

20 Claims, 15 Drawing Sheets

(58) Field of Classification Search
CPC ............ A63B 69/3667; A63B 71/0619; G06K 9/00342; G09B 19/0038
See application file for complete search history.

(56) References Cited

U.S. PATENT DOCUMENTS

| | | | |
|---|---|---|---|
| 9,770,658 B2 | 9/2017 | Bentley | |
| 9,999,823 B2 | 6/2018 | Chen et al. | |
| 10,456,676 B2 | 10/2019 | Bentley | |
| 10,463,958 B2 | 11/2019 | Bentley | |
| 2006/0166737 A1 | 7/2006 | Bentley | |
| 2007/0270214 A1 | 11/2007 | Bentley | |
| 2009/0005188 A1* | 1/2009 | Iwatsubo | G06T 7/251 473/223 |
| 2013/0072316 A1* | 3/2013 | Morin | A63B 69/36 473/223 |
| 2013/0260909 A1* | 10/2013 | Margoles | A63B 69/36 473/223 |
| 2013/0344973 A1* | 12/2013 | Margoles | G06K 9/00342 473/223 |
| 2014/0114453 A1 | 4/2014 | Bentley | |
| 2015/0018130 A1* | 1/2015 | Johnson | G06K 9/00342 473/409 |
| 2017/0004358 A1* | 1/2017 | Bose | G06Q 10/0833 |
| 2017/0354859 A1* | 12/2017 | Okazaki | A63B 71/0622 |
| 2018/0056184 A1 | 3/2018 | Bentley | |
| 2018/0243627 A1* | 8/2018 | Ishihara | A63B 69/3608 |
| 2019/0015745 A1 | 1/2019 | Bentley | |
| 2019/0054376 A1 | 2/2019 | Bentley | |
| 2019/0095718 A1* | 3/2019 | Yamamoto | G06K 9/00335 |

FOREIGN PATENT DOCUMENTS

| | | |
|---|---|---|
| JP | 2015002913 A | 1/2015 |
| JP | 2015116288 A | 6/2015 |

OTHER PUBLICATIONS

Japanese Office Action dated Oct. 15, 2019 (and English translation thereof) issued in Japanese Patent Application No. 2016-226235.

* cited by examiner

IMAGE PROCESSING APPARATUS, ANALYSIS SYSTEM, AND METHOD FOR PROCESSING IMAGES

CROSS-REFERENCE TO RELATED APPLICATIONS

This application is based upon and claims the benefit of priority under 35 USC 119 of Japanese Patent Application No. 2016-226235 filed on Nov. 21, 2016, including the description, claims, drawings, and abstract, is incorporated herein by reference in its entirety.

BACKGROUND OF THE INVENTION

1. Field of the Invention

The present invention relates to image processing apparatuses, analysis systems, and methods for processing images.

2. Description of the Related Art

Recently in order to improve sport skills, various techniques for analyzing the motion of a subject have been studied.

For instance, JP-A-2015-002913 discloses a technique in the field of swing-motion analysis. According to this technique, information on the motion of a subject is acquired by a sensor, a reference mage is created based on the information from the sensor, and the image is displayed for a user.

SUMMARY OF THE INVENTION

An image processing apparatus according to the present invention includes: a processor which conducts the functions as the units of: an image acquisition unit configured to acquire a taken image of a subject; a measurement-result acquisition unit configured to acquire a measurement result of a motion of the subject measured with a sensor; an index creation unit configured to create an index indicating the motion of the subject based on the measurement result acquired by the measurement-result acquisition unit; and a display control unit configured to display the image acquired by the image acquisition unit and the index created by the index creation unit together on a display unit.

An analysis system according to the present invention includes: an imaging device including an imaging unit to take an image of a subject; a detection device attached to the subject, the detection device including a measurement unit configured to measure a motion of the subject with a sensor; an image acquisition unit configured to acquire a taken image of the subject from the imaging device; a measurement-result acquisition unit configured to acquire a measurement result of a motion of the subject measured with a sensor from the detection device; an index creation unit configured to create an index indicating the motion of the subject based on the measurement result acquired by the measurement-result acquisition unit; and a display control unit configured to display the image acquired by the image acquisition unit and the index created by the index creation unit together on a display unit.

A method for processing an image according to the present invention is executed by an image processing apparatus, and the method includes: an image acquisition step of acquiring a taken image of a subject; a measurement-result acquisition step of acquiring a measurement result of a motion of the subject measured with a sensor; an index creation step of creating an index indicating the motion of the subject based on the measurement result acquired by the measurement-result acquisition step; and a display control step of displaying the image acquired by the image acquisition step and the index created by the index creation step together on a display unit.

DETAILED DESCRIPTION OF THE INVENTION

Embodiments of the present invention will be explained with reference to the drawings.
[System Configuration]

Figure 1:
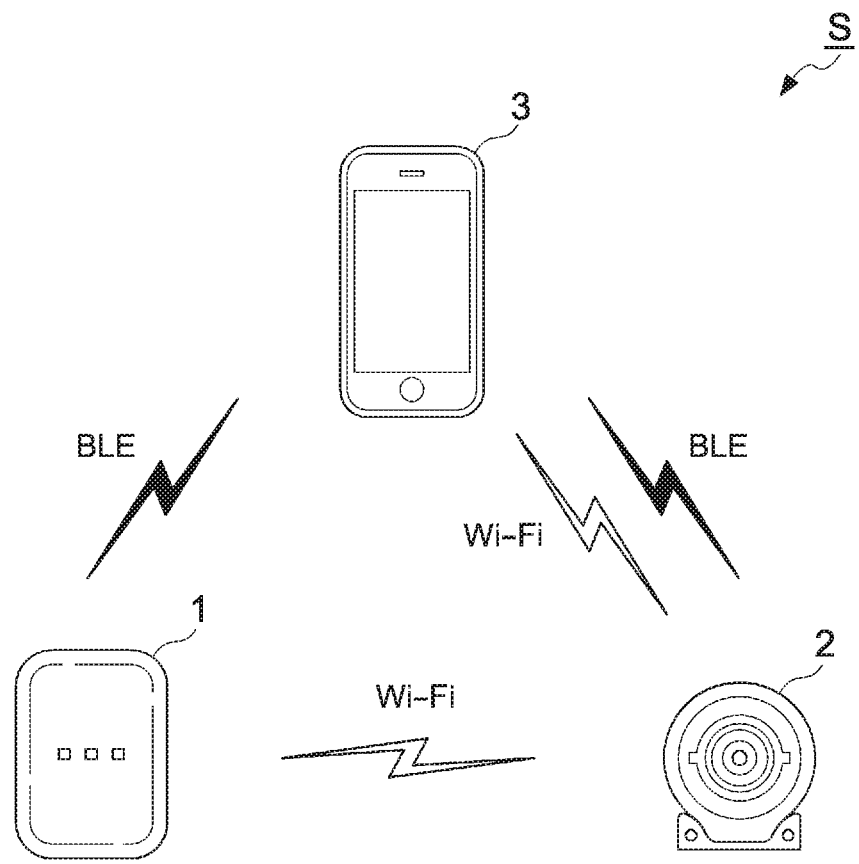
FIG. 1 shows the configuration of an analysis system according to one embodiment of the present invention.
Figure 2:
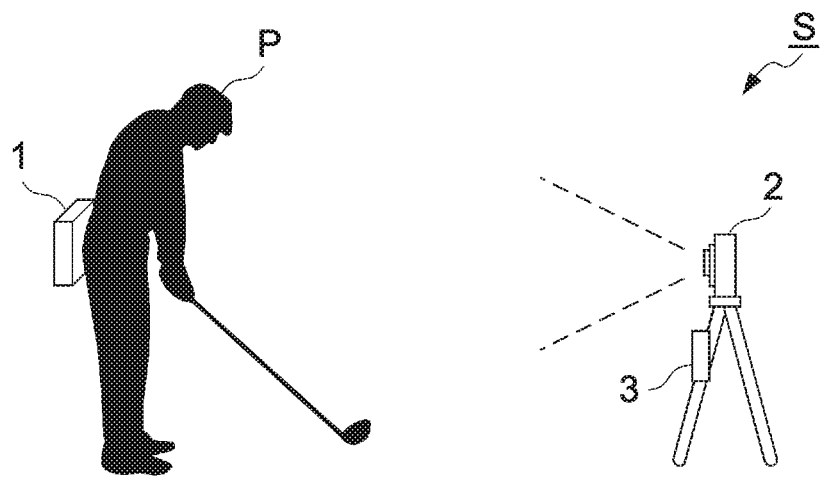
FIG. 2 schematically shows an example of the use of the analysis system.

FIG. 1 shows the configuration of an analysis system S according to one embodiment of the present invention. FIG. 2 schematically shows an example of the use of the analysis system S.

As shown in FIGS. 1 and 2, the analysis system S includes a sensor unit 1, an imaging device 2, and a processor 3. The processor 3 and the sensor unit 1 or the imaging device 2 are communicable via Bluetooth low energy/Bluetooth LE (registered trademark) (hereinafter called "BLE"). The imaging device 2 and the sensor unit 1 or the processor 3 are communicable via Wi-Fi (Wireless Fidelity).

The sensor unit 1 is attached to a measurement target to sense the motion of the target, and transmits the sensed information to the processor 3. In the present embodiment, a subject who performs a golf swing (hereinafter called a "measurement subject P") wears the sensor unit 1 on the waist, for example, for sensing of the motion.

The imaging device 2 takes an image of the measurement target, and transmits data in the form of a moving image showing the motion of the measurement target to the processor 3. In the present embodiment, the imaging device 2 takes a moving image of the measurement subject P when the subject performs a golf swing.

The processor 3 analyzes sensor information acquired from the sensor unit 1 that the measurement target wears, and displays a result of the analysis (in the present embodiment, postural change or the movement of the measurement target) together with the moving image showing the motion of the measurement target. In the present embodiment, the processor 3 animation-displays the analysis result of the measurement target with a box-shaped object to schematically show the three-dimensional motion of the measurement target. This object is an index showing the three-dimensional motion of the measurement target. Before displaying of the analysis result of the measurement target, the processor 3 displays a rough image of the motion of the measurement target based on the sensor information.

[Hardware Configuration]

Figure 3:
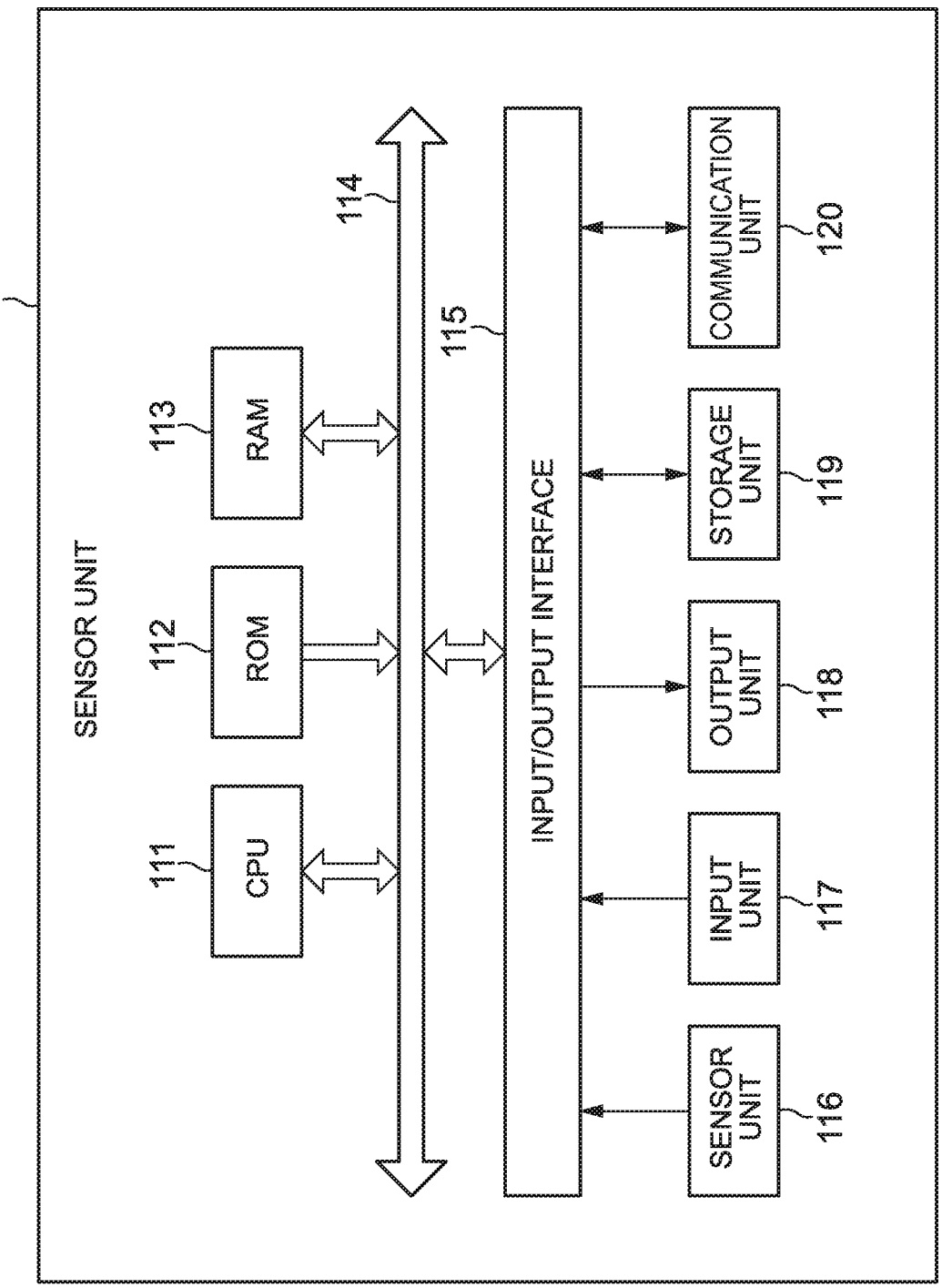
FIG. 3 is a block diagram showing the configuration of hardware of a sensor unit.

FIG. 3 is a block diagram showing the configuration of hardware of the sensor unit 1.

The sensor unit 1 is configured as a device including various types of sensors to detect the motion of the measurement target.

As shown in FIG. 3, the sensor unit 1 includes: a CPU (Central Processing Unit) 111; a ROM (Read Only Memory) 112, a RAM (Random Access Memory) 113; a bus 114, an input/output interface 115; a sensor unit 116; an input unit 117; an output unit 118; a storage unit 119; and a communication unit 120. To the sensor unit 1, a removable medium may be attached. The removable medium may be a semiconductor memory, for example.

The CPU 111 executes various types of processing in accordance with a program recorded in the ROM 112 or a program loaded in the RAM 113 from the storage unit 119.

The RAM 113 stores data required to execute various types of processing by the CPU 111, for example, as needed.

The CPU 111, the ROM 112 and the RAM 113 are mutually connected via the bus 114. This bus 114 is connected to the input/output interface 115 as well. To the input/output interface 115, the sensor unit 116, the input unit 117, the output unit 118, the storage unit 119 and the communication unit 120 are connected.

The sensor unit 116 includes a triaxial acceleration sensor to measure the acceleration in triaxial directions, a triaxial angular velocity sensor to measure the angular velocity in triaxial directions, and a triaxial geomagnetic sensor to measure the earth magnetism in triaxial directions. The sensor unit 116 measures the acceleration, the angular velocity and the earth magnetism by the triaxial acceleration sensor, the triaxial angular velocity sensor and the triaxial geomagnetic sensor with a predetermined sampling period (e.g., every 0.001 sec.). The data on the acceleration and the angular velocity measured by the sensor unit 116 is associated with the data on the measurement time, and is stored in the storage unit 119 or is transmitted to the processor 3.

The input unit 117 includes various buttons, for example, with which a user inputs various types of information for instruction.

The output unit 118 includes a lamp, a speaker or a vibration motor, for example, to output light, sound and a vibration signal.

The storage unit 119 includes a semiconductor memory, such as DRAM (Dynamic Random Access Memory), and stores various types of data.

The communication unit 120 controls communication with other devices via direct wireless-communications among the terminals. In the present embodiment, the communication unit 120 communicates with the processor 3 via BLE (registered trademark) and communicates with the imaging device 2 via Wi-Fi.

Figure 4:
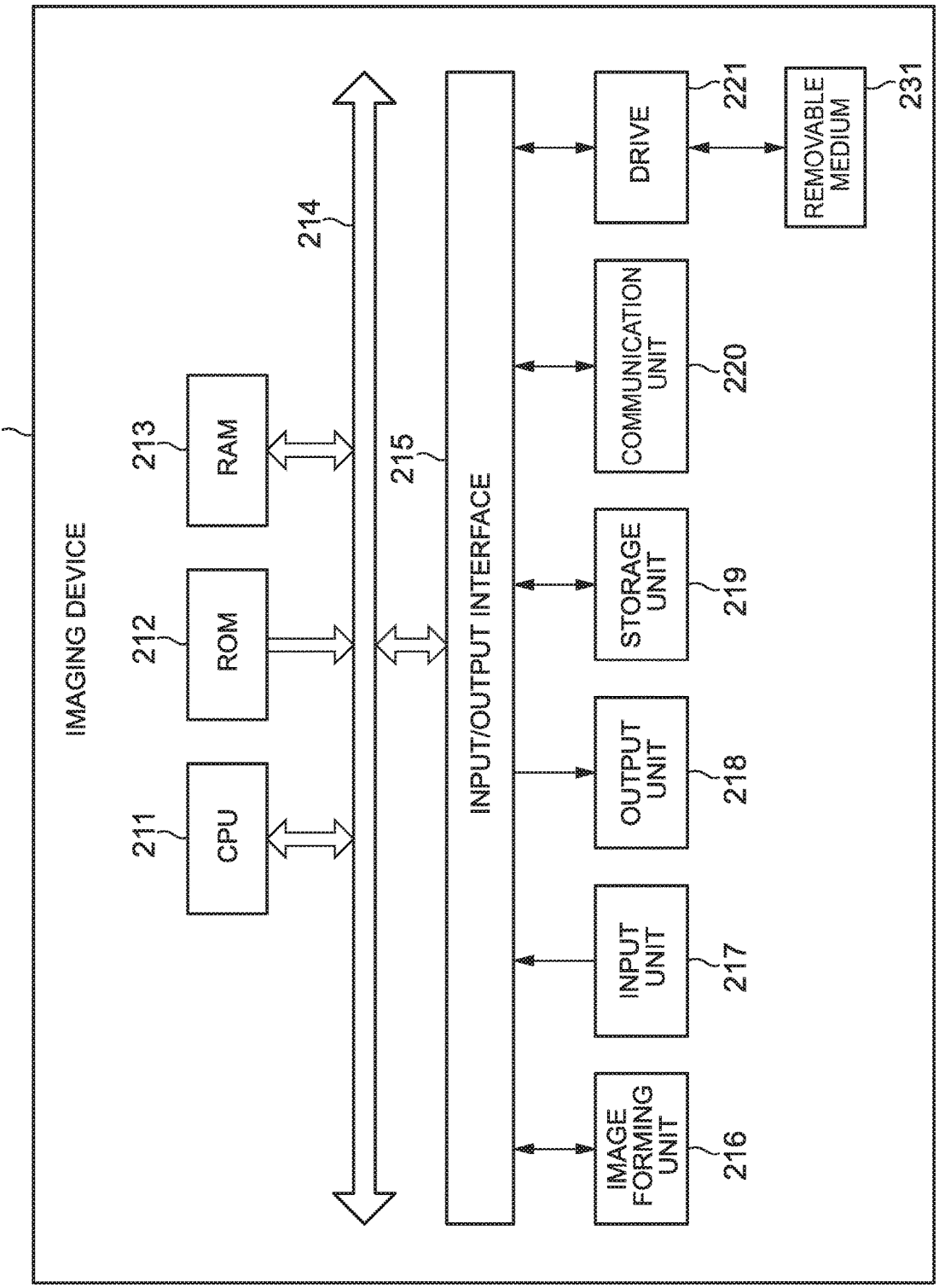
FIG. 4 is a block diagram of the hardware configuration of the imaging device.

FIG. 4 is a block diagram of the hardware configuration of the imaging device 2.

The imaging device 2 has a function of taking an image, and includes a digital camera, for example. In the present embodiment, the imaging device 2 is configured as a device separated from the display and having an imaging function as a unit.

As shown in FIG. 4, the imaging device 2 includes: a CPU 211; a ROM 212, a RAM 213; a bus 214, an input/output interface 215; an image-forming unit 216; an input unit 217; an output unit 218; a storage unit 219; a communication unit 220; and a drive 221.

Among them, the configuration other than the image-forming unit 216, the communication unit 220 and the drive 221 is the same as the corresponding parts in FIG. 3.

Although not shown, the image-forming unit 216 includes an optical lens unit and an image sensor.

The optical lens unit includes a lens to collect light, such as a focus lens or a zoom lens to take an image of the subject.

The focus lens is to form an image of the subject on a receiving surface of the image sensor. The zoom lens is to change the focal length freely in a certain range.

The optical lens unit may further include a peripheral circuit to adjust setting parameters, such as a focal point, exposure, or white balance as needed.

The image sensor includes a photoelectric conversion element, an AFE (Analog Front End) or the like.

The photoelectric conversion element may include a CMOS (Complementary Metal Oxide Semiconductor) type photoelectric conversion element, for example. An image of the subject is incident on the photoelectric conversion element from the optical lens unit. The photoelectric conversion element photoelectric-converts (imaging) the image of the subject to store an image signal for a certain time period, and sequentially supplies the stored image signal to the AFE as an analog signal.

The AFE executes various types of signal processing of this analog image signal, such as A/D (Analog/Digital) conversion. The AFE creates a digital signal through the various types of signal processing, and the image-forming unit 216 outputs the digital signal as an output signal.

Such an output signal from the image-forming unit 216 is called "taken-image data". The taken-image data is supplied to the CPU 221, for example, at appropriate times.

The communication unit 220 controls communications with other devices through direct wireless-communications among the terminals. In the present embodiment, the communication unit 220 communicates with the processor 3 via BLE (registered trademark) and communicates with the imaging device 2 and the processor 3 via Wi-Fi.

A removable medium 231 may be attached to the drive 221 as needed. The removable medium may be a magnetic disk, an optical disk, a magneto-optical disk, or a semiconductor memory, for example. The drive 221 may read a program from the removable medium 231, and the program may be installed in the storage unit 219 as needed. Similarly to the storage unit 219, the removable medium 231 may store various types of data, such as image data stored in the storage unit 219.

Figure 5:
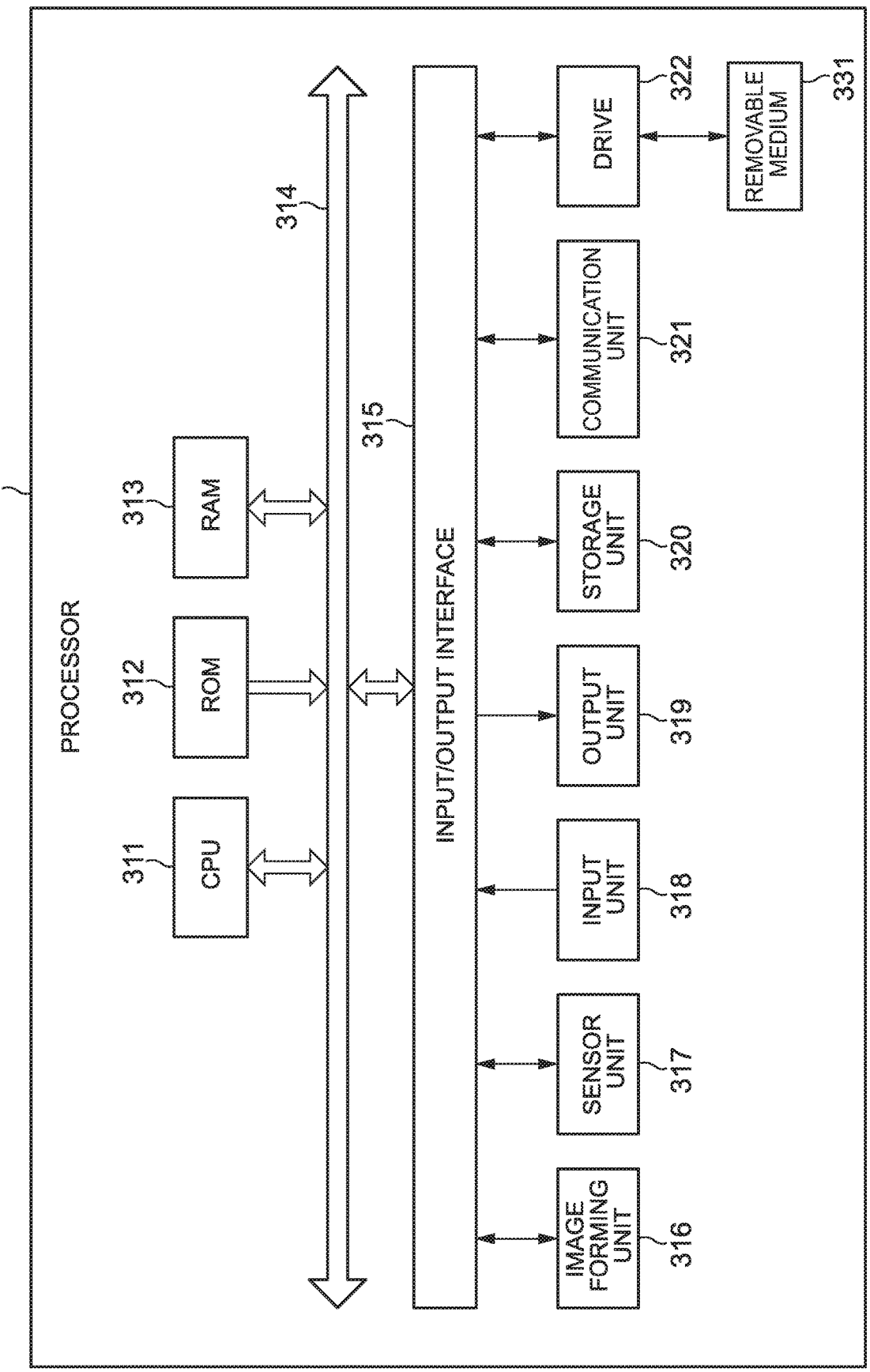
FIG. 5 is a block diagram of the hardware configuration of the processor.

FIG. 5 is a block diagram of the hardware configuration of the processor 3.

The processor 3 is an information processing apparatus having an information display function, and may be configured as a smartphone, for example.

As shown in FIG. 5, the processor 3 includes: a CPU 311; a ROM 312, a RAM 313; a bus 314, an input/output interface 315; an image-forming unit 316; a sensor unit 317; an input unit 318; an output unit 319; a storage unit 320; a communication unit 321; and a drive 322. A removable medium 331 may be attached to the drive 322 as needed. The removable medium may be a magnetic disk, an optical disk, a magneto-optical disk, or a semiconductor memory, for example.

Among them, the configuration other than the input unit 318, the output unit 319 and the communication unit 321 is the same as the corresponding parts in FIGS. 3 and 4.

The input unit 318 includes various buttons and a touch panel, for example, with which a user inputs various types of information for instruction.

The output unit 319 includes a display or a speaker, for example, to output an image and sound.

The communication unit 321 controls communication with other devices (not illustrated) via a network including internet. The communication unit 321 controls communication with other devices through direct wireless-communications among the terminals. In the present embodiment, the communication unit 321 communicates with the sensor unit 1 and the imaging device 2 via BLE (registered trademark) and communicates with the imaging device 2 via Wi-Fi.

[Functional Configuration]

Figure 6:
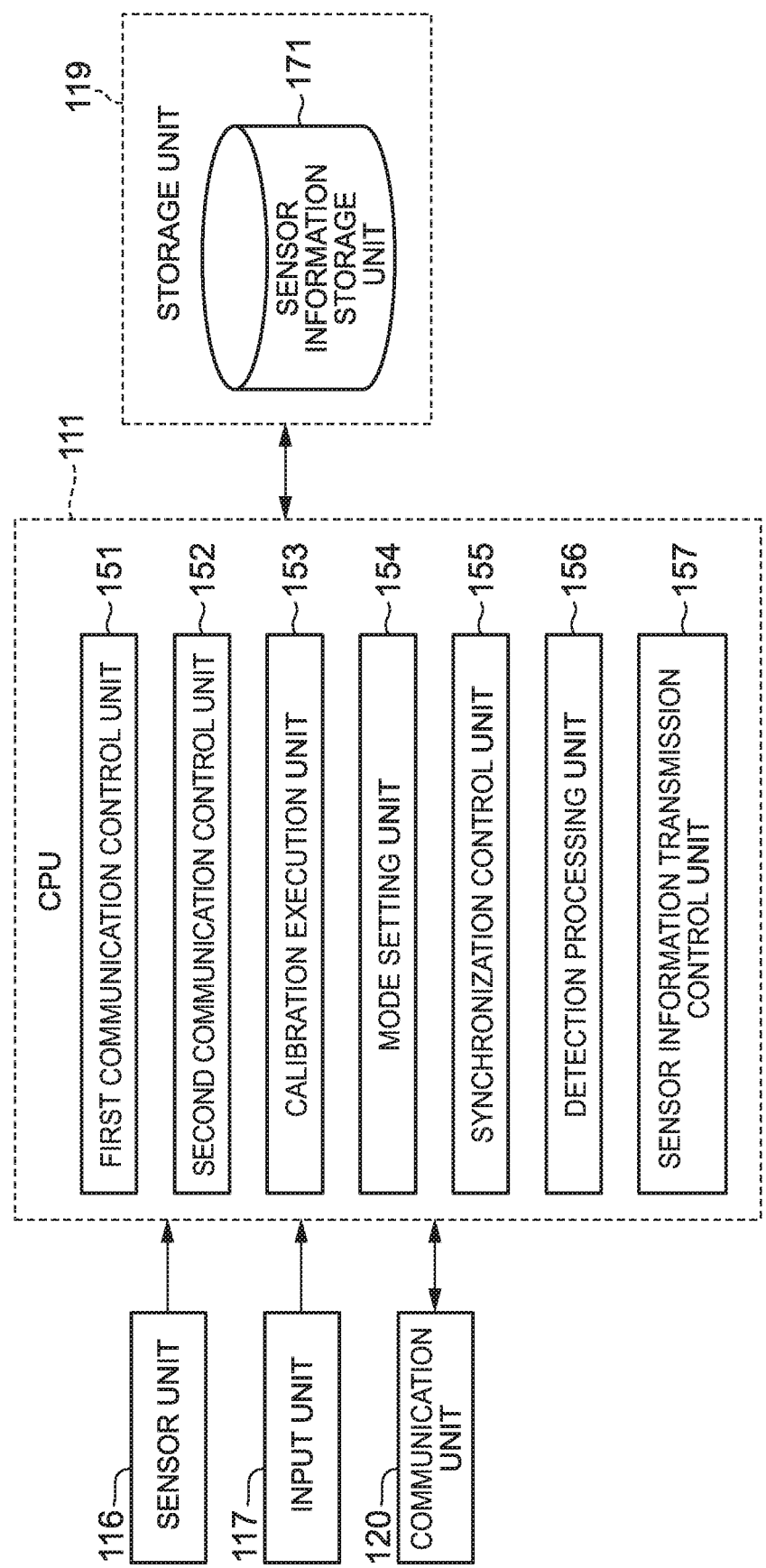
FIG. 6 is a block diagram showing the functional configuration of the sensor unit to execute information detection processing.

FIG. 6 is a block diagram showing the functional configuration of the sensor unit 1 to execute information detection processing.

The information detection processing is a series of processing executed to analyze the motion of a measurement target by the analysis system S. In this processing, the sensor unit 1 attached to the measurement target senses the motion of the target.

For the execution of the information detection processing, a first communication control unit 151, a second communication control unit 152, a calibration execution unit 153, a mode setting unit 154, a synchronization control unit 155, a detection processing unit 156, and a sensor information transmission control unit 157 of the CPU 111 function as shown in FIG. 6.

A sensor information storage unit 171 is set at a region of the storage unit 119.

The first communication control unit 151 controls a communication of the sensor unit 1 via BLE, and executes paring and data transmission/reception with other devices.

The second communication control unit 152 controls a communication of the sensor unit 1 via Wi-Fi, and executes data transmission/reception with other devices.

The calibration execution unit 153 acquires sensor information in the reference state in response to an instruction from the processor 3, and executes calibration using the acquired result as a reference value. In the present embodiment, the calibration execution unit 153 sets, as a reference, the state where the measurement subject P wears the sensor unit 1 on the waist, and has an addressing posture at a position for golf swing, and executes calibration using the sensor information acquired in this state as the reference value.

Figure 7A:
FIG. 7A schematically shows the wearing state of the sensor unit.
Figure 7B:
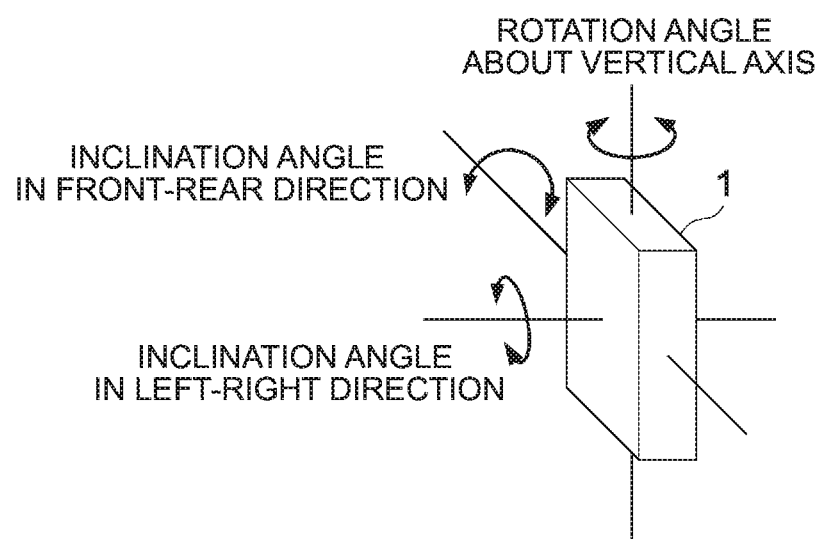
FIG. 7B schematically shows an example of information detected by the sensor unit.

FIG. 7A schematically shows the wearing state of the sensor unit 1, and FIG. 7B schematically shows an example of information detected by the sensor unit 1.

During calibration, as shown in FIG. 7A, the measurement subject P wears the sensor unit 1 on the waist using a belt, for example, and has an addressing posture toward the ball at the position for a golf swing and stands still for a certain time period (e.g., 2 sec.). At this time, as shown in FIG. 7B, the sensor unit 1 acquires sensor information based on the direction of gravity detected by the triaxial acceleration sensor and the orientation detected by the triaxial geomagnetic sensor, and sets the acquired sensor information as a reference value for addressing. The sensor information includes an inclination angle of the body in the front-rear direction, an inclination angle in the left-right direction and a rotation angle about the vertical axis. During the following golf swing by the measurement subject P, when the sensor information detected by the sensor unit 1 is within a range of threshold set for the sensor information with reference to the reference value for addressing for a predetermined time period (e.g., 2 sec.) or longer, then the sensor unit detects that the subject is in the addressing state.

Since the sensor unit 1 includes the triaxial acceleration sensor, the displacement (e.g., translation) of the sensor unit 1 also can be detected in addition to the information shown in FIG. 7B. Since the sensor unit 1 includes the triaxial geomagnetic sensor, the orientation of the sensor unit 1 also can be detected.

The mode setting unit 154 sets any one of a plurality of prepared motion modes in accordance with an instruction from the processor 3. For the analysis system S of the present embodiment, the prepared modes include a real-time mode and a one-shot mode. The real-time mode is to display animation created from sensor information acquired by the sensor unit 1 as well as a live view image of the measurement subject P. The one-shot mode is to display a synthetic image of the moving image of the measurement subject P during the golf swing and animation created from the sensor information acquired by the sensor unit 1 during the swing.

When the one-shot mode is set, the synchronization control unit 155 synchronizes the reference time of the sensor unit 1 and the imaging device 2 via a communication by Wi-Fi. The reference time between the sensor unit 1 and the imaging device 2 can be synchronized by SNTP (Simple Network Time Protocol), for example.

When the sensor unit 1 is set at the real-time mode or at the one-shot mode, the detection processing unit 156 acquires various types of sensor information successively, associates the acquired sensor information with the acquired time, and stores the same in the sensor information storage unit 171. The sensor information stored in the sensor information storage unit 171 may be discarded sequentially after a lapse of a certain time from the acquired time. Note here that the sensor information acquired from the addressing of a golf swing to the end of the swing at the one-shot mode is discarded at least after the transmission of the information to the processor 3.

The detection processing unit 156 detects a timing of a predetermined characteristic point in the golf swing based on the sensor information acquired at the one-shot mode. For instance, the detection processing unit 156 analyzes the waveform of the sensor information acquired at the one-shot mode to detect the timing of the points including the addressing, the top, the downswing, the impact and the follow-through.

When detecting the timing of addressing and the timing of follow-through at the one-shot mode, the detection processing unit 156 transmits a signal indicating the detection of the address timing (hereinafter called an "address detection signal") and a signal indicating the detection of the follow-through timing (hereinafter called a "follow-through detection signal") to the processor 3 successively via BLE.

Then the detection processing unit 156 detects the range of the start to the end of the golf swing (hereinafter this may be called "one-shot"). In the present embodiment, the detection processing unit 156 detects the timing from the address to the follow-through in the golf swing by the measurement subject P as the range of one shot. Then the detection processing unit 156 transmits a signal indicating the detected range of one shot (hereinafter called a "one-shot range detection signal") to the processor 3 via BLE.

The sensor information transmission control unit 157 controls to transmit the sensor information acquired by the detection processing unit 156 to the processor 3. In the present embodiment, the detection processing unit 156 can acquire sensor information at about the rate of 1000 samples/sec., for example. The sensor information transmission control unit 157 converts the sensor information acquired by the detection processing unit 156 to have a low sampling rate (e.g., about at 30 samples/sec.) in the real-time mode and to have a high sampling rate (e.g., about at 240 samples/sec.) in the one-shot mode. Then, the sensor information transmission control unit transmits the converted sensor information to the processor 3. In the one-shot mode, the sensor information in the one-shot range is transmitted to the processor 3. In the present embodiment, prior to the transmission of the sensor information in the one-shot range, the sensor information transmission control unit 157 transmits sensor information on the predetermined characteristic points (address, top, downswing, impact and follow-through) in the golf swing by the measurement subject P to the processor 3. In this way, the sensor information on the predetermined characteristic points is transmitted first to the processor 3, whereby the processor 3 can display a simple display image at an earlier timing.

When transmitting the sensor information to the processor 3 in the one-shot mode, the sensor information transmission control unit 157 transmits the timing of each point including the address, the top, the downswing, the impact, and the follow-through detected by the detection processing unit 156 as well to the processor 3.

In the present embodiment, the sensor information acquired by the detection processing unit 156 is converted into a waveform from which the influences from noise have been reduced by filtering of the output signal from the various types of sensors. The sensor information transmission control unit 157 then transmits, to the processor 3, the sensor information acquired from the waveform that the thus processed sensor information represents.

Thereby, the motion of the measurement subject P can be analyzed by referring to more reliable information than the sensor information having a wide range of variations due to influences from noise.

Next, the following describes the functional configuration of the imaging device 2.

Figure 8:
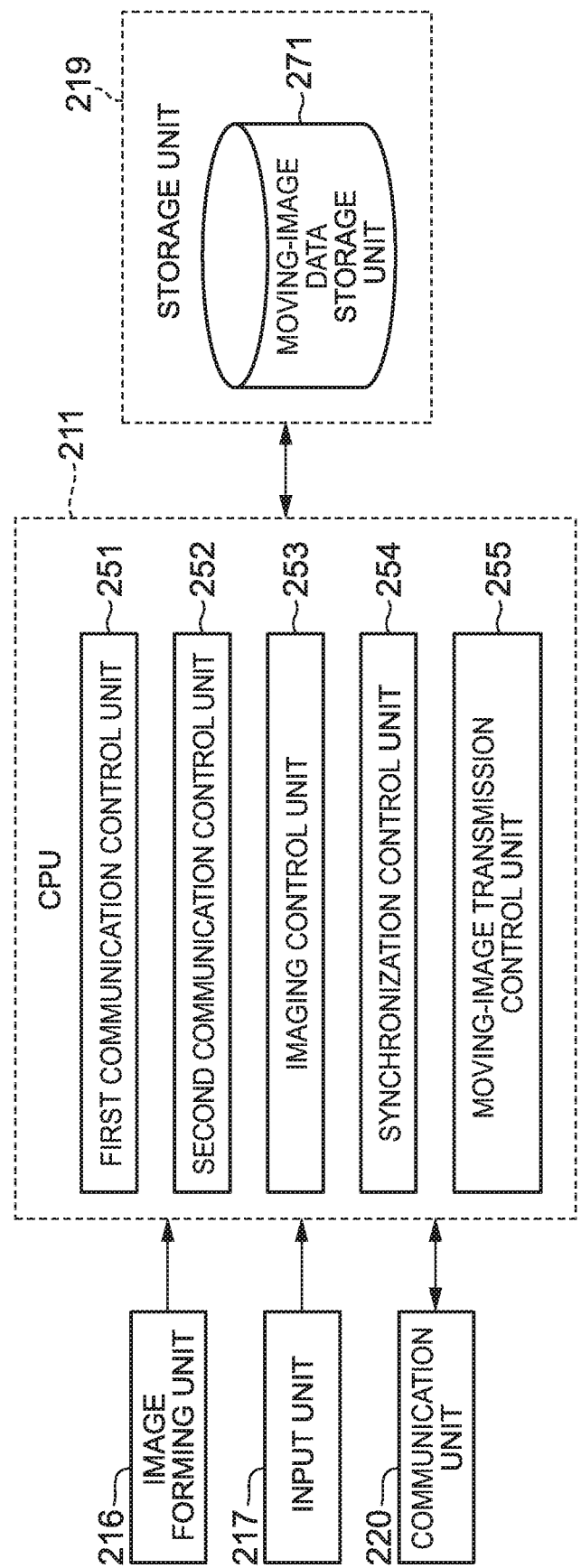
FIG. 8 is a block diagram showing the functional configuration of the imaging device to execute imaging processing.

FIG. 8 is a block diagram showing the functional configuration of the imaging device 2 to execute imaging processing.

The imaging processing is a series of processing executed to analyze the motion of a measurement target by the analysis system S. In this processing, a moving image of the motion of the measurement target is taken in synchronization with the acquisition of sensor information by the sensor unit 1.

For the execution of the imaging processing, a first communication control unit 251, a second communication control unit 252, an imaging control unit 253, a synchronization control unit 254, and a moving-image transmission control unit 255 of the CPU 211 function as shown in FIG. 8.

A moving-image data storage unit 271 is set at a region of the storage unit 219.

The first communication control unit 251 controls a communication of the imaging device 2 via BLE, and executes paring and data transmission/reception with other devices.

The second communication control unit 252 controls a communication of the imaging device 2 via Wi-Fi, and executes data transmission/reception with other devices. In the present embodiment, when a communication is performed via Wi-Fi, the imaging device 2 serves as an access point (AP) and the other devices serve as stations (ST).

When receiving an instruction from the processor 3 to shift to the real-time mode, the imaging control unit 253 controls the image-forming unit 216 to take a live view image at an imaging rate (e.g., 30 fps) preset for the imaging rate of the live view image. When receiving an instruction from the processor 3 to take a moving image for recording, the imaging control unit 253 controls the image-forming unit 216 to take a moving image for recording at an imaging rate (e.g., 240 fps) preset for the imaging rate of the moving image for recording. The moving-image data storage unit 271 stores the thus taken moving image for recording.

After the one-shot mode is set, the synchronization control unit 254 synchronizes the reference time of the sensor unit 1 and the imaging device 2 via a communication by Wi-Fi.

The moving-image transmission control unit 255 transmits, to the processor 3, the live view image or the moving image for recording taken under the control of the imaging control unit 253. Specifically, when receiving an instruction from the processor 3 to take a live view image in the real-time mode, the moving-image transmission control unit 255 transmits the taken live view image to the processor 3 successively. When receiving an instruction from the processor 3 to take a moving image for recording in the one-shot mode, the moving-image transmission control unit 255 cuts out the range from the start to the end of the moving image for recording sent from the processor 3 (i.e., the range of one-shot) and transmits the same to the processor 3.

Next, the following describes the functional configuration of the processor 3.

Figure 9:
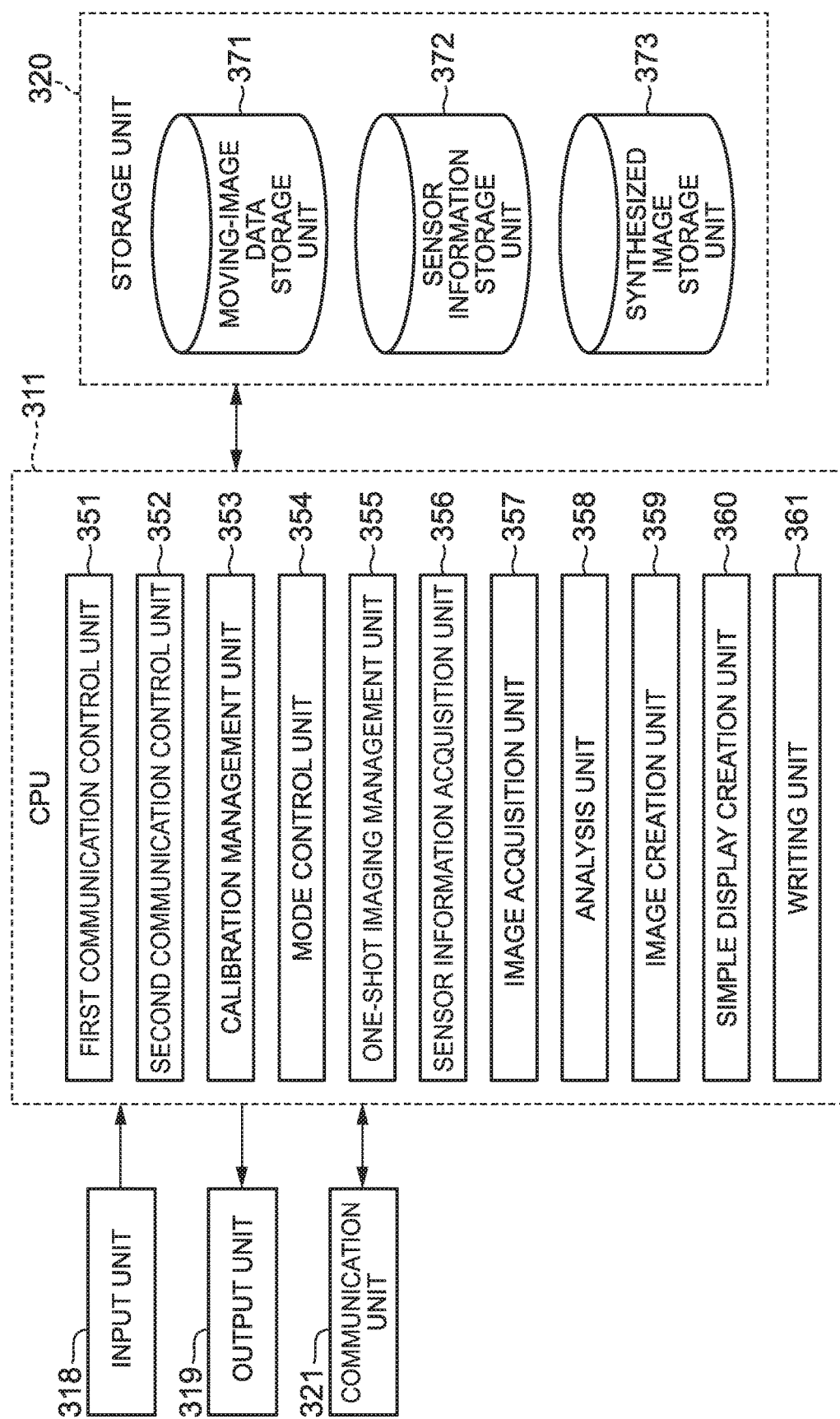
FIG. 9 is a block diagram showing the functional configuration of the processor to execute analysis-result display processing.

FIG. 9 is a block diagram showing the functional configuration of the processor 3 to execute analysis-result display processing.

The analysis-result display processing is a series of processing to analyze the sensor information detected by the sensor unit 1 at the time corresponding to the moving image taken by the imaging device 2, create animation simulating the three-dimensional motion of the body of the measurement subject P, and synthesize the animation with the moving image taken by the imaging device 2 for displaying.

For the execution of the analysis-result display processing, a first communication control unit 351, a second communication control unit 352, a calibration management unit 353, a mode control unit 354, a one-shot imaging management unit 355, a sensor information acquisition unit 356, an image acquisition unit 357, an analysis unit 358, an image creation unit 359, a simple display creation unit 360, and a writing unit 361 of the CPU 311 function as shown in FIG. 9.

A moving-image data storage unit 371, a sensor information storage unit 372 and a synthesized image storage unit 373 are set at a region of the storage unit 320.

The first communication control unit 351 controls a communication of the processor 3 via BLE, and executes paring and data transmission/reception with other devices. In the present embodiment, when a communication is performed via BLE, the processor 3 serves as a master and the other devices serve as slaves.

The second communication control unit 352 controls a communication of the processor 3 via Wi-Fi, and executes data transmission/reception with other devices.

The calibration management unit 353 instructs the sensor unit 1 to execute calibration. In the present embodiment, calibration at the sensor unit 1 is executed once after the activation of the sensor unit 1 and before shifting to the real-time mode or to the one-shot mode.

When an operation is performed to shift to the real-time mode, the mode control unit 354 instructs the sensor unit 1 and the imaging device 2 to shift to the real-time mode via BLE. When an operation is performed to shift to the one-shot mode, the mode control unit 354 instructs the sensor unit 1 to shift to the one-shot mode.

The one-shot imaging management unit 355 manages the taking of a moving image in the one-shot range in the real-time mode. Specifically, when receiving an address detection signal from the sensor unit 1, the one-shot imaging management unit 355 instructs the imaging device 2 to take a moving image for recording. When receiving a follow-through detection signal from the sensor unit 1, the one-shot imaging management unit 355 instructs the imaging device 2 to stop the taking of a moving image for recording. When receiving a one-shot range detection signal from the sensor unit 1, the one-shot imaging management unit 355 informs the imaging device 2 of the one-shot range to be cut out from the taken moving image. When the acquisition of the sensor information from the sensor unit 1 ends in the one-shot mode, the one-shot imaging management unit 355 instructs the imaging device 2 to transmit the moving image.

In the real-time mode, the sensor information acquisition unit 356 acquires sensor information with a period (low sampling rate) corresponding to the imaging rate of the live view image (e.g., 30 fps) successively from the sensor unit 1 via BLE. In the one-shot mode, the sensor information acquisition unit 356 acquires sensor information with a period (high sampling rate) corresponding to the imaging rate of the moving image for recording (e.g., 240 fps) from the sensor unit 1 via BLE. In the one-shot mode of the present embodiment, prior to acquisition of the sensor information in the one-shot range, the sensor information acquisition unit 356 acquires sensor information on the predetermined characteristic points (address, top, downswing, impact and follow-through) in the golf swing by the measurement subject P from the sensor unit 1 via BLE.

In the real-time mode, the image acquisition unit 357 acquires a live view image transmitted from the imaging device 2 successively via Wi-Fi. In the one-shot mode, the imaging device 2 takes a moving image for recoding, and the range of each one-shot is cut out. Subsequently the image acquisition unit 357 collectively acquires the moving images via Wi-Fi.

The analysis unit 358 analyzes various types of sensor information acquired from the sensor unit 1 to create data representing a temporal change of the animation (hereinafter this may be called "BOX animation") shown with a box-type object simulating the three-dimensional motion of the body of the measurement subject P. In the real-time mode of the present embodiment, the analysis unit 358 creates data representing a temporal change of the BOX animation from the sensor information with the period corresponding to the imaging rate of the live view image. In the one-shot mode, the analysis unit 358 creates data representing a temporal change of the BOX animation from the sensor information with the period corresponding to the imaging rate of the moving image for recording.

The image creation unit 359 displays the live view image acquired in the real time mode together with the BOX animation created by the analysis unit 358.

Figure 10:
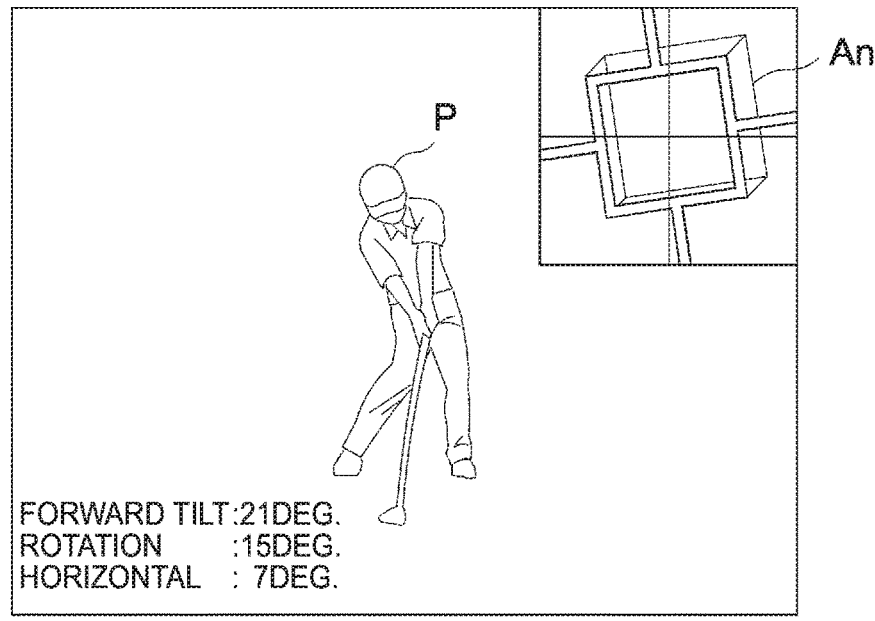
FIG. 10 schematically shows a display example in the real-time mode.

FIG. 10 schematically shows a display example in the real-time mode.

As shown in FIG. 10, in the real-time mode, the image creation unit 359 displays the measurement subject P at the center, for example, and displays the BOX animation An at a predetermined position around the image of the measurement subject P. The BOX animation An may be displayed at a position around the image of the measurement subject P close to the unit of the body of the measurement subject P on which the sensor unit 1 is attached. The image creation unit 359 displays numerical values of the sensor information corresponding to the BOX animation An at a predetermined position (lower left in this example) in the image. Specifically, in the example of FIG. 10, "forward tilt: 21 deg." is displayed as the inclination angle of the body in the front-rear direction, "rotation: 15 deg." is displayed as the rotation angle about the vertical axis, and "horizontal: 7 deg." is displayed as the inclination angle in the left-right direction.

The image creation unit 359 synthesizes the BOX animation created by the analysis unit 358 with the moving image for recoding acquired in the one-shot mode for displaying. Hereinafter an image displayed by the image creation unit 359 in this way may be called an "analysis-result moving image".

Figure 11:
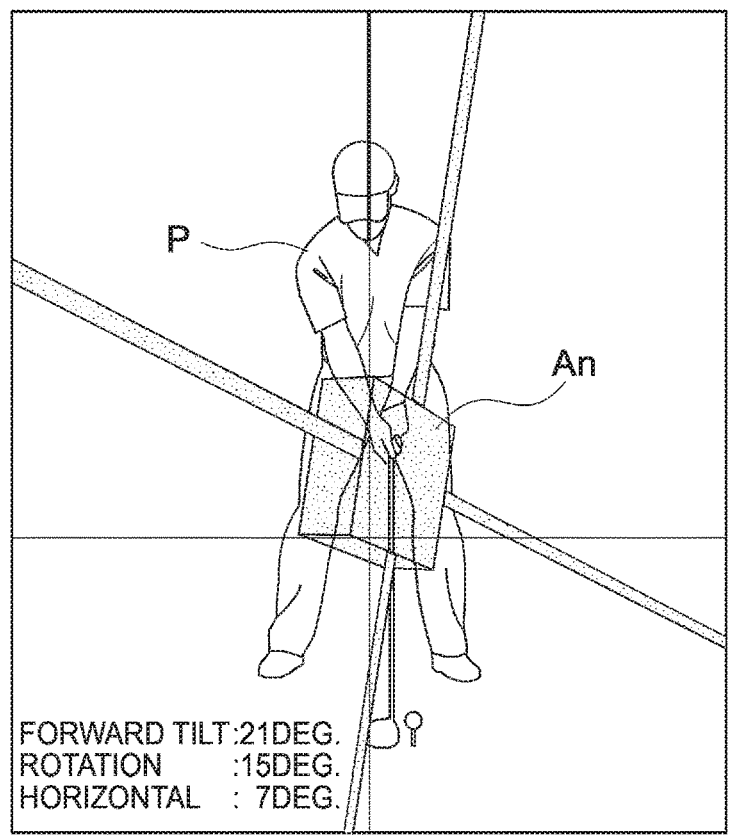
FIG. 11 schematically shows a display example in the one-shot mode.

FIG. 11 schematically shows a display example in the one-shot mode.

As shown in FIG. 11 in the one-shot time mode, the image creation unit 359 overlaps the transparent BOX animation An on the moving image of the measurement subject P, for example, so as to display an analysis-result moving image. In the present embodiment, the BOX animation An is displayed with a straight line indicating the axis (in this example, the up-down direction and the left-right direction) of the sensor unit 1. These axes of the sensor unit 1 move with the motion of the sensor unit 1. In the present embodiment, in a display example of the one-shot mode, axes fixed to the display screen (i.e., axes indicating the absolute coordinates) also are displayed.

The temporal change of the BOX animation is displayed so as to correspond to the timing of the taken moving image of the measurement subject P.

The sensor information and the moving image of the measurement subject P are displayed in this way in the one-shot mode. Thereby, the tendency in the motion of the body of the measurement subject P can be easily shown with the BOX animation, and the sensor information, which is hard for the BOX animation to represent, can be shown clearly by the sensor information. Since the axes of the sensor unit 1 and the axes fixed to the display screen are displayed together, the translation, for example, of the measurement subject P also can be displayed, which facilitates the understanding of the body motion of the measurement subject P.

In the one-shot mode, the simple display creation unit 360 refers to data on the predetermined characteristic points (address, top, downswing, impact and follow-through) in the golf swing by the measurement subject P acquired prior to the sensor information in the one-shot range, and sequentially displays the images of the swing corresponding to these characteristic points prepared in advance together with their corresponding numerical values of the sensor information. Hereinafter a series of images displayed by the simple display creation unit 360 may be called a "simple display image".

In the one-shot mode, when the sensor unit acquires sensor information and the imaging device 2 takes a moving image, then the processor 3 makes the sensor information acquisition unit 356 acquire the sensor information from the sensor unit 1 first. Next, the processor makes the image acquisition unit 357 acquire the data on the moving image for recoding from the imaging device 2. At this time, since the data on the moving image for recoding from the imaging device 2 has a relatively large data amount, the image acquisition unit 357 needs a certain time to acquire the data. Then, in the present embodiment, after the image acquisition unit 357 starts to acquire the data on the moving image for recoding from the imaging device 2, the simple display creation unit 360 displays a simple display image. The simple display creation unit 360 continues the displaying of the simply display image after the image acquisition unit 357 ends the acquisition of the data on the moving image for recoding from the imaging device 2 and before the image creation unit 359 synthesizes BOX animation with the moving image for recoding and displays the synthesized image.

Figure 12:
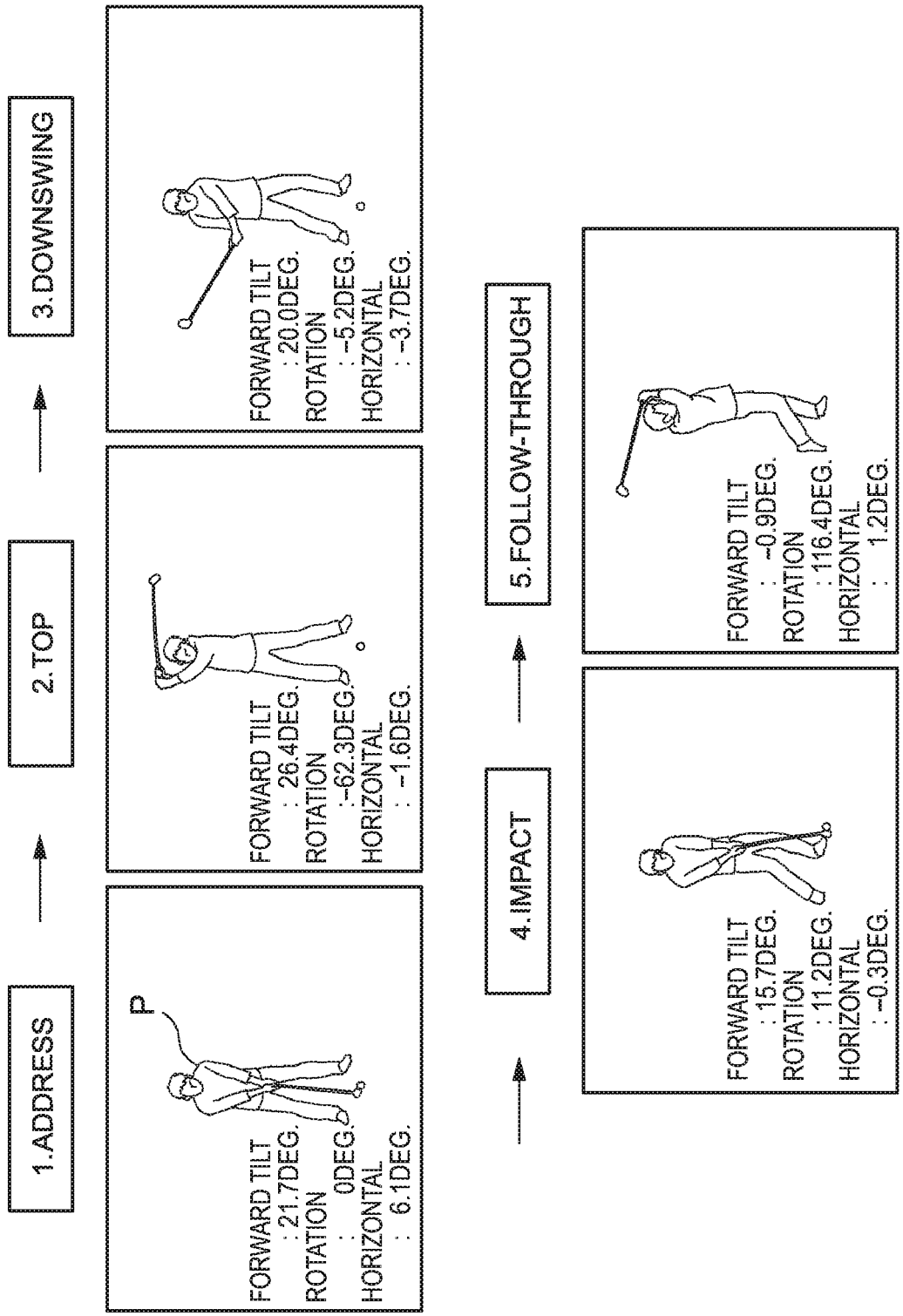
FIG. 12 schematically shows a display example of a simple display image at the characteristic points in a golf swing.

FIG. 12 schematically shows a display example of the simple display image at the characteristic points in the golf swing.

As shown in FIG. 12, the simple display creation unit 360 displays the images prepared in advance for the characteristic points, including address, top, downswing, impact and follow-through in the golf swing together with numerical values on the sensor information at the corresponding characteristic points in the swing by the measurement subject P.

The simple display creation unit 360 displays each of these simple display images at the characteristic points sequentially for a predetermined time. After displaying the simple display image of the follow-through, then the simple display image of the top may be displayed again. In this way, the simple display images can be displayed cyclically.

These simple display images displayed enable the presentation of information on the motion of the measurement subject P having certain significance in advance.

In FIG. 12, the inclination angles in the front-rear direction and in the left-right direction of the body of the measurement subject P may be displayed as 0 at the timing of address, and a variation in rotation angle and inclination angles of the body of the measurement subject may be displayed relative to those at the timing of address.

The writing unit 361 writes the analysis-result moving image displayed by the image creation unit 359 in the data form of a predetermined saving format (MPEG, for example) in the storage unit 320 or in the removable medium 331. The writing unit 361 writes the analysis-result moving image when the user operates to instruct the storage of the analysis-result moving image.

[Operation]

Next, the following describes the operation of the analysis system S.

Figure 13:
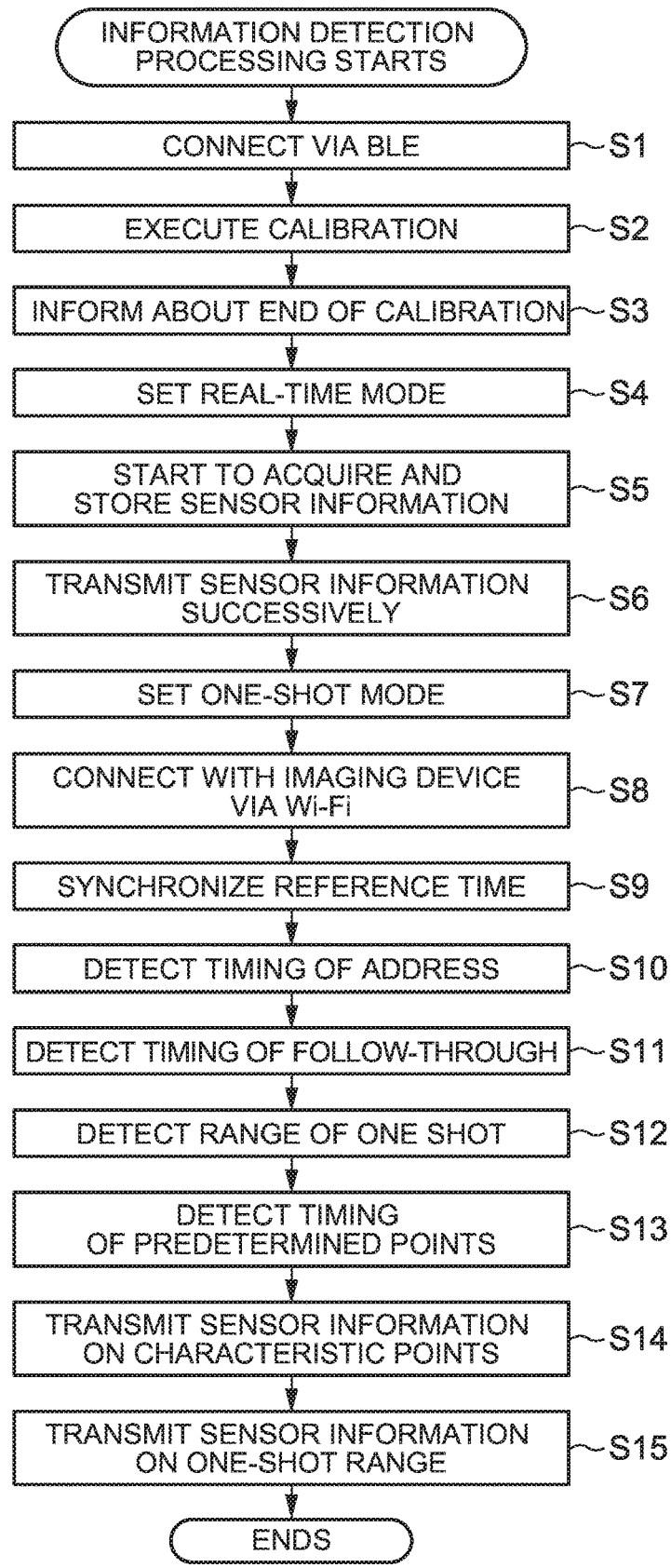
FIG. 13 is a flowchart to explain the flow of the information detection processing executed by the sensor unit.

FIG. 13 is a flowchart to explain the flow of the information detection processing executed by the sensor unit 1.

The information detection processing starts with the activation of the sensor unit 1.

At Step S1, the first communication control unit 151 as a slave connects with the processor 3 via BLE.

At Step S2, the calibration execution unit 153 acquires sensor information in the reference state in response to an instruction from the processor 3, and executes calibration using the acquired result as a reference value.

At Step S3, the calibration execution unit 153 informs the processor 3 of the end of the calibration via BLE.

At Step S4, the mode setting unit 154 sets real-time mode in accordance with an instruction from the processor 3.

At Step S5, the detection processing unit 156 starts the processing to acquire various types of sensor information successively, associate the acquired sensor information with the acquired time, and store the same in the sensor information storage unit 171.

At Step S6, the sensor information transmission control unit 157 converts the sensor information acquired by the detection processing unit 156 to have a low sampling rate (e.g., about 30 samples/sec.) and transmits the same to the processor 3 successively.

At Step S7, the mode setting unit 154 sets one-shot mode in accordance with an instruction from the processor 3.

At Step S8, the second communication control unit 152 as a station connects with the imaging device 2 via Wi-Fi.

At Step S9, the synchronization control unit 155 synchronizes the reference time of the sensor unit 1 and the imaging device 2 via a communication by Wi-Fi.

At Step S10, the detection processing unit 156 analyzes the waveform of the acquired sensor information, detects the timing of the address point in the golf swing, and transmits the address detection signal to the processor 3 via BLE.

At Step S11, the detection processing unit 156 analyzes the waveform of the acquired sensor information, detects the timing of the follow-through point in the golf swing, and transmits the follow-through detection signal to the processor 3 via BLE.

At Step S12, the detection processing unit 156 detects the timing from the address to the follow-through in the golf swing by the measurement subject P as the range of one shot, and transmits the one-shot range detection signal to the processor 3.

At Step S13, the detection processing unit 156 analyzes the waveform of the sensor information acquired to detect the timing of the points including the top, the downswing and the impact in the golf swing successively.

At Step S14, the sensor information transmission control unit 157 transmits sensor information on the predetermined characteristic points (address, top, downswing, impact and follow-through) in the golf swing by the measurement subject P to the processor 3 via BLE. In this way, the sensor information on the predetermined characteristic points is transmitted first to the processor 3, whereby the processor 3 can display a simple display image at an earlier timing. The processing at Step S13 and at Step S14 may be executed prior to the processing at Step S12.

At Step S15, the sensor information transmission control unit 157 converts the sensor information in the one-shot range to have a high sampling rate (e.g., about 240 samples/sec.) and transmits the same to the processor 3 via BLE. When transmitting the sensor information in the one-shot range to the processor 3, the sensor information other than the information on the characteristic points already transmitted at Step S14 may be transmitted. This can avoid the repeated transmission of the same sensor information, and so the sensor information can be transmitted more effectively.

After Step S15, the information detection processing ends.

Next, the following describes the imaging processing executed by the imaging device 2.

Figure 14:
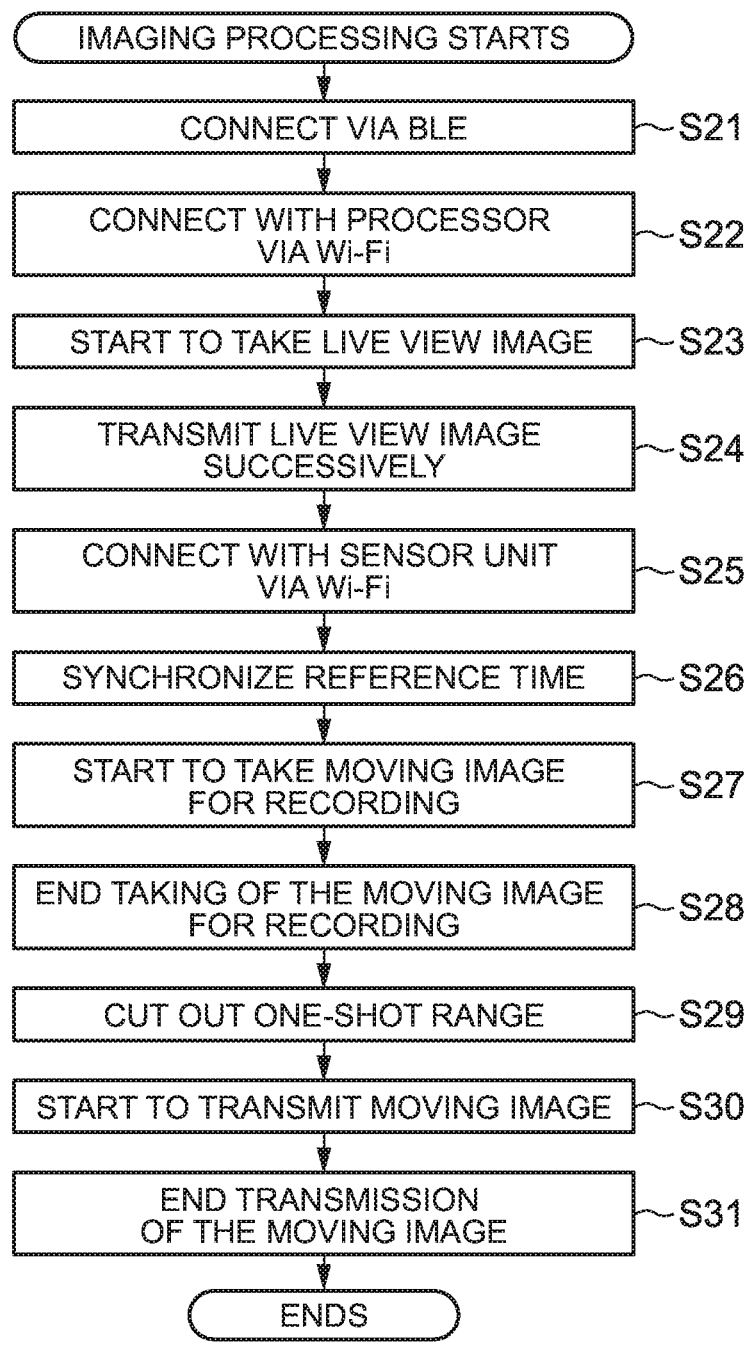
FIG. 14 is a flowchart to explain the flow of the imaging processing executed by the imaging device.

FIG. 14 is a flowchart to explain the flow of the imaging processing executed by the imaging device 2.

The imaging processing starts with user's operation using the input unit 217 to instruct the start of the imaging processing.

At Step S21, the first communication control unit 251 as a slave connects with the processor 3 via BLE.

At Step S22, the second communication control unit 252 as an access point connects with the processor 3 via Wi-Fi.

At Step S23, when the processor 3 instructs to shift to the real-time mode, the imaging control unit 253 starts to control the image-forming unit 216 to take a live view image at an imaging rate (e.g., 30 fps) preset for the imaging rate of the live view image.

At Step S24, the moving-image transmission control unit 255 transmits the live view image taken to the processor 3 successively.

At Step S25, the second communication control unit 252 as an access point connects with the sensor unit 1 via Wi-Fi.

At Step S26, the synchronization control unit 254 synchronizes the reference time of the sensor unit 1 and the imaging device 2 via a communication by Wi-Fi.

At Step S27, when the processor 3 instructs to take a moving image for recording, the imaging control unit 253 starts to control the image-forming unit 216 to take a moving image for recording at an imaging rate (e.g., 240 fps) preset for the imaging rate of the moving image for recording.

At Step S28, when the processor 3 instructs to end the taking of the moving image for recording, the imaging control unit 253 controls the image-forming unit 216 to end the taking of the moving image for recording.

At Step S29, when the processor 3 informs the moving-image transmission control unit of the one-shot range, the moving-image transmission control unit 256 cuts out the one-shot range from the moving image for recording.

At Step S30, when the processor 3 instructs to transmit the moving image, the moving-image transmission control unit 256 starts to transmit the cut-out moving image in the one-shot range to the processor 3.

At Step S31, the moving-image transmission control unit 256 ends the transmission of the moving image started at Step S30.

After Step S31, the imaging processing ends.

Next, the following describes the analysis-result display processing executed by the processor 3.

Figure 15:
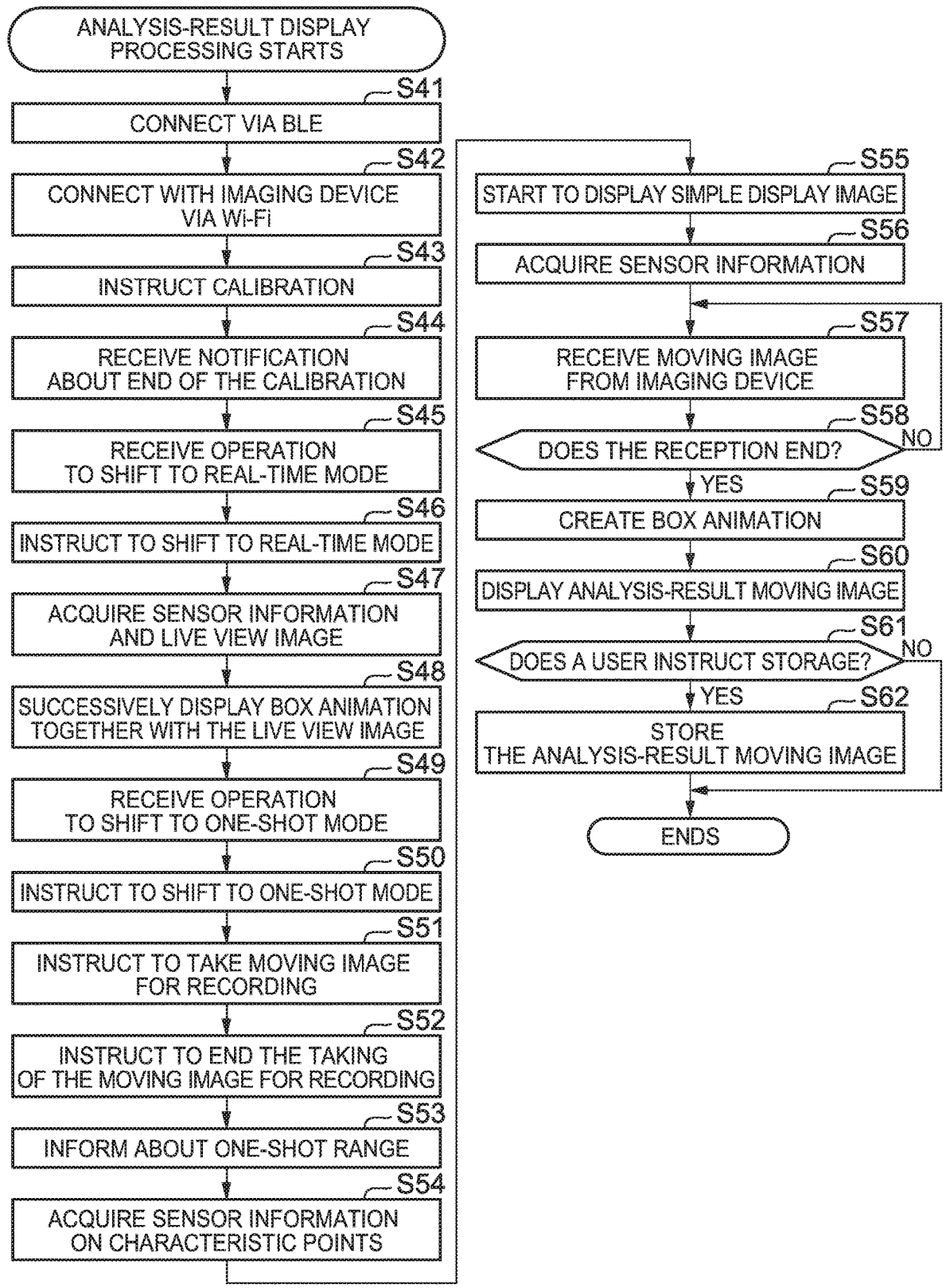
FIG. 15 is a flowchart to explain the flow of the analysis-result display processing executed by the processor.

FIG. 15 is a flowchart to explain the flow of the analysis-result display processing executed by the processor 3.

The analysis-result display processing starts with user's operation using the input unit 318 to instruct the start of the analysis-result display processing.

At Step S41, the first communication control unit 351 as a master connects with the sensor unit 1 and the imaging device 2 via BLE.

At Step S42, the second communication control unit 352 as a station connects with the imaging device 2 via Wi-Fi.

At Step S43, the calibration management unit 353 instructs the sensor unit 1 to execute calibration.

At Step S44, the calibration management unit 353 receives a notification about the end of the calibration from the sensor unit 1 via BLE.

At Step S45, the mode control unit 354 receives an input of the operation to shift to the real-time mode (instruction of remote shooting).

At Step S46, the mode control unit 354 instructs the sensor unit 1 and the imaging device 2 via BLE to shift to the real-time mode.

At Step S47, the sensor information acquisition unit 356 acquires sensor information with the period (low sampling rate) corresponding to the imaging rate of the live view image (e.g., 30 fps) from the sensor unit 1 via BLE. The image acquisition unit 357 acquires the live view images transmitted from the imaging device 2 successively via Wi-Fi.

At Step S48, the analysis unit 358 successively creates data representing a temporal change of the BOX animation from the sensor information with the period corresponding to the imaging rate of the live view image acquired from the sensor unit 1, and the image creation unit 359 successively displays BOX animation created by the analysis unit 358 together with the acquired live view image.

At Step S49, the mode control unit 354 receives an input of the operation to shift to the one-shot mode.

At Step S50, the mode control unit 354 instructs the sensor unit 1 to shift to the one-shot mode via BLE. At this time, the mode control unit 354 transmits a SSID (Service Set IDentifier) of the imaging device 2 as well to the sensor unit 1.

At Step S51, when receiving the address detection signal from the sensor unit 1, the one-shot imaging management unit 355 instructs the imaging device 2 to take a moving image for recording.

At Step S52, when receiving the follow-through detection signal from the sensor unit 1, the one-shot imaging management unit 355 instructs the imaging device 2 to end the taking of the moving image for recording.

At Step S53, when receiving a one-shot range detection signal from the sensor unit 1, the one-shot imaging management unit 355 informs the imaging device 2 of the one-shot range to be cut out from the taken moving image.

At Step S54, the sensor information acquisition unit 356 receives sensor information on the predetermined characteristic points (address, top, downswing, impact and follow-through) in the golf swing by the measurement subject P from the sensor unit 1 via BLE.

At Step S55, the simple display creation unit 360 refers to data on the predetermined characteristic points (address, top, downswing, impact and follow-through) in the golf swing by the measurement subject P, and sequentially displays the images of the swing corresponding to these characteristic points prepared in advance together with their corresponding numerical values of the sensor information. In this way, simple display images are displayed.

At Step S56, the sensor information acquisition unit 356 converts sensor information with the period (high sampling rate) corresponding to the imaging rate for moving image for recording (e.g., 240 fps) from the sensor unit 1 via BLE.

At Step S57, the one-shot imaging management unit 355 receives moving image from the imaging device 2.

At Step S58, the one-shot imaging management unit 355 determines whether the reception of the moving image from the imaging device 2 ends or not.

When the reception of the moving image from the imaging device 2 does not end, the one-shot imaging management unit determines NO at Step S58, and the procedure shifts to Step S57.

When the reception of the moving image from the imaging device 2 ends, the one-shot imaging management unit determines YES at Step S58, and the procedure shifts to Step S59.

At Step S59, the analysis unit 358 creates data representing a temporal change of the BOX animation from the sensor information with the period corresponding to the imaging rate for moving image for recording acquired from the sensor unit 1.

At Step S60, the image creation unit 359 synthesizes the BOX animation created by the analysis unit 358 with the acquired moving image for recoding for displaying. In this way, an analysis-result moving image is displayed.

At Step S61, the writing unit 361 determines whether a user performs the operation to instruct the storage of the analysis-result moving image or not.

When the user does not perform the operation to instruct the storage of the analysis-result moving image, the wiring unit determines NO at Step S61. Then, the analysis-result display processing ends.

When the user performed the operation to instruct the storage of the analysis-result moving image, the wiring unit determines YES at Step S61. Then, the procedure shifts to Step S62.

At Step S62, the writing unit 361 writes the analysis-result moving image displayed by the image creation unit 359 in the data form of a predetermined saving format (MPEG, for example) in the storage unit 320 or in the removable medium 331.

After Step S62, the analysis-result display processing ends.

Such processing allows the analysis system S to acquire the sensor information acquired by measuring the motion of the body of the measurement subject P and the taken moving image on the motion of the measurement subject P in a synchronization manner. Then, based on the sensor information, the analysis system S creates BOX animation, simulating the three-dimensional motion of the body of the measurement subject P, and synthesizes the BOX animation with the moving image taken by the imaging device 2. In this way, the analysis system S can display the analysis-result moving image.

The analysis-result moving image displays the motion of the body of the measurement subject P, the BOX animation representing the three-dimensional motion of the measurement subject P for easy understanding, and the sensor information acquired by measuring the motion of the measurement subject P in a synchronization manner.

This enables intuitive and easy understanding of information with the BOX animation, which would be difficult to acquire only from the moving image of the motion of the measurement subject P, and enables clear understanding of more detailed characteristics of the motion with the sensor information that is displayed in synchronization. The temporal change of the BOX animation is associated with the sensor information, and so the user can know the correct analysis result also by referring to the BOX animation.

The analysis system S is configured to display certain information on the motion of the measurement subject P prior to the display of the analysis-result moving image in the one-shot mode. Thereby, unnecessary waiting time can be avoided.

Figure 16:
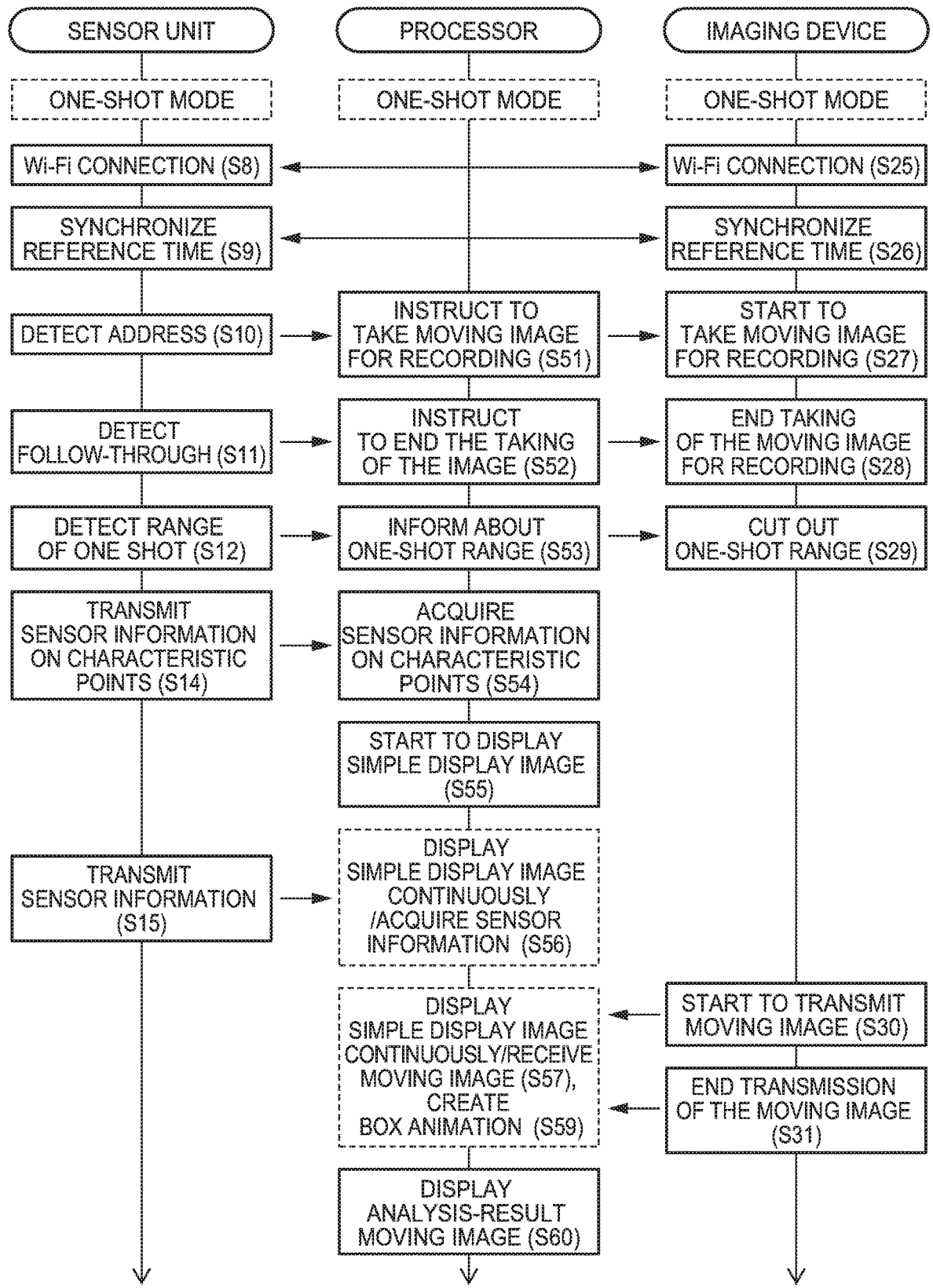
FIG. 16 schematically shows timing of the processing among the devices in the one-shot mode.

FIG. 16 schematically shows timing of the processing among the devices in the one-shot mode.

As shown in FIG. 16, in the one-shot mode, prior to acquisition of sensor information and moving image to display an analysis-result moving image, the processor 3 acquires sensor information on predetermined characteristic points in the golf swing by the measurement subject P first (Step S54 of FIG. 15). Then, while displaying such information on the motion of the measurement subject P as a simple display image (Step S55 of FIG. 15), the processor acquires sensor information in the one-shot range (Step S56) and then receives data of moving image (Step S57 of FIG. 15). Then after the reception of the moving image data ends (YES: at Step S58 of FIG. 5) and creation of the BOX animation (Step S59 of FIG. 5) and before the displaying of the analysis-result moving image is ready (Step S60 of FIG. 5), such a simple display image is continuously displayed.

In this way, instead of simply waiting during the time of acquiring the moving image data, the processor 3 can display the information on the motion of the measurement subject P having certain significance in advance. This allows a user to understand the motion of the subject more effectively.

Such presentation in advance of the information on the motion of the measurement subject P enables creation of a time zone where a user views the presented information in addition to the minimum duration required to create the analysis-result moving image. As a result, longer time duration can be kept to create the analysis-result moving image, and so a more effective analysis-result moving image can be presented.

The analysis system S allows automatic detection of the address point of the measurement subject P in the one-shot mode for taking of a moving image for recording.

This allows the measurement subject P to take successive moving images for recording by repeating a simple operation of the addressing and the swing.

Modified Example 1

In the above embodiment, BOX animation may be displayed in variously modified manners as long as the animation simulates a three-dimensional motion of the body of the measurement subject P.

Figure 17:
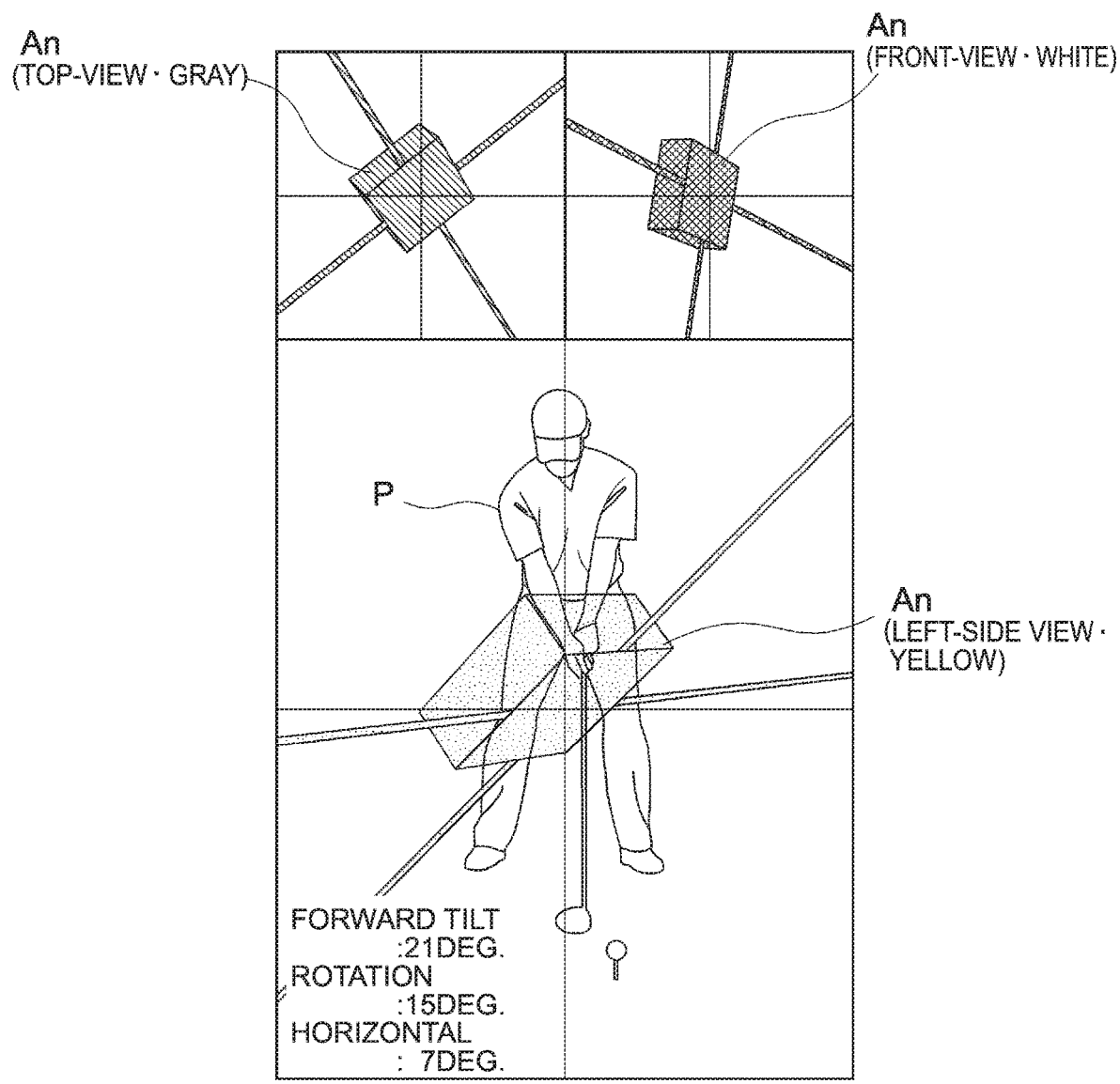
FIG. 17 schematically shows an example of a display mode of BOX animation.

FIG. 17 schematically shows an example of a display mode of BOX animation An.

In the example of FIG. 17, a plurality of viewpoints of the BOX animation An may be selected, including a front view, a top view, a left-side view and the like. In the example of FIG. 17, BOX animation An in selectable views is displayed in a small size at the upper unit of the screen.

The display color of the BOX animation An may be selected for easy understanding of a three-dimensional motion of the body of the measurement subject P.

In the example of FIG. 17, the BOX animation An from each viewpoint has a different color.

When the BOX animation is overlapped on the moving image of the measurement subject P for displaying, the color of background may be detected and a predetermined color that is not easy to merge with the background (e.g., a complementary color) may be used for the BOX animation.

Modified Example 2

The above embodiment describes a display example in the real-time mode, in which the measurement subject P is displayed at the center and the BOX animation An is displayed at a predetermined position around the image of the measurement subject P. Alternatively, also in the real time mode, the transparent BOX animation An may be overlapped on the moving image of the measurement subject P as in the display example of the one-shot mode of FIG. 11.

Alternatively, in the one-shot mode as well, the measurement subject P may be displayed at the center and the BOX animation An may be displayed at a predetermined position around the image of the measurement subject P as in the display example of the real time mode of FIG. 10.

Modified Example 3

The above embodiment describes the example, in which the measurement subject P wears one sensor unit 1 on the waist, for example, to acquire sensor information. This is not a limiting example. That is, the measurement subject P may wear the sensor unit 1 at each of a plurality of body parts, such as a shoulder and a waist, so as to display BOX animation representing the motions of these body parts.

In this case, a difference in motion among the body parts of the measurement subject P (e.g., twisted motion between shoulder and waist) may be displayed so as to present a measurement result more effectively.

The sensor units 1 may be attached to various body parts other than waist, including shoulder, neck, arms, thigh, head and the like.

Modified Example 4

In the above embodiment, continuous moving image of the motion of the measurement subject P is displayed in the display example of the one-shot mode. Alternatively, intermittent moving image of the motion of the measurement subject P may be displayed.

In this case, processing load to create analysis-result moving image can be lowered, and so the analysis-result moving image can be presented at an earlier timing.

Modified Example 5

When the transparent BOX animation is displayed on the moving image of the measurement subject P in the above embodiment, the degree of transparence may be set to have a different value depending on the purpose. For instance, when a human-like object is displayed as a guide of the motion that the measurement subject P should follow, the overlapping between the body of the measurement subject P and the human-like object may be significant. In this case, the degree of transparence of the BOX animation may be increased (i.e., displayed lightly). When the overlapping between the body of the measurement subject P and the human-like object is not significant, the degree of transparence of the BOX animation may be decreased (i.e., displayed darkly).

This enables a more effective display mode of the BOX animation as a guide of the motion of the measurement subject P.

Modified Example 6

In the above embodiment, an image of the measurement subject P wearing the sensor unit 1 is taken by the imaging device 2, whereby the position of the sensor unit 1 on the body may be determined automatically.

In this case, when the BOX animation An is displayed at a position close to the unit of the body of the measurement subject P on which the sensor unit 1 is attached in the display example of the real time mode, for example, the position of the BOX animation to be displayed also can be determined automatically.

The thus configured analysis system S includes the sensor unit 1, the imaging device 2, and the processor 3. The sensor unit 1 is attached to a subject, and includes the detection processing unit 156 to measure the motion of the subject with a sensor. The imaging device 2 includes the imaging control unit 253 to take an image of the subject. The processor 3 includes the image acquisition unit 357, the sensor information acquisition unit 356, the analysis unit 358, and the image creation unit 359.

The image acquisition unit 357 acquires a taken image of the subject.

The sensor information acquisition unit 356 acquires a measurement result of the motion of the subject measured with a sensor.

The analysis unit 358 creates an index indicating the motion of the subject based on the measurement result acquired by the sensor information acquisition unit 356.

The image creation unit 359 makes the output unit 319 display an image acquired by the image acquisition unit 357 and an index created by the analysis unit 358 together.

Thereby, the moving image of the subject, the index representing the motion of the subject for easy understanding, and the measurement result obtained through the measurement of the subject can be displayed together.

This enables intuitive and easy understanding of information with the index, which would be difficult to acquire only from the moving image of the motion of the subject, and enables clear and correct understanding of the characteristics of the motion because the measurement result is displayed with the index.

Therefore the present invention enables presentation of the measurement result on the motion of the subject more easily.

The analysis unit 358 creates the index indicating the three-dimensional motion of the subject based on the measurement result.

This enables more intuitive and easier understanding of the motion of the subject.

The analysis unit 358 creates a stereoscopic box image as the index indicating the motion of the subject based on the measurement result.

This enables more intuitive and easier understanding of the motion of the subject.

The sensor information acquisition unit 356 acquires a measurement result measured with a sensor that the subject wears.

This enables acquisition of a more correct measurement result.

The image acquisition unit 357 acquires an image of the subject taken by the imaging device.

This enables acquisition of a more appropriate image of the subject.

The image creation unit 359 displays an index overlapped on an image of the subject.

This enables easy understanding of the motion of the subject and a change in index.

The image creation unit 359 displays the index overlapped on an image of the subject at the position corresponding to the body unit of the subject at which the sensor measures the motion.

This enables easier understanding of the motion at the body unit of the subject.

The image creation unit 359 displays the index around the image of the subject.

This enables display of the index indicating a three-dimensional motion of the subject so that a user can recognize the image of the subject easily.

The image creation unit 359 displays the index around the image of the subject so as to correspond to the body unit of the subject at which the sensor measures the motion.

This enables easier understanding of the motion at the body unit of the subject so that a user can easily recognize the image of the subject.

The sensor information acquisition unit 356 acquires a measurement result of the motion of a plurality of body parts of the subject with sensors.

The analysis unit 358 creates the index at each of the plurality of parts.

The image creation unit 359 makes the output unit 319 display an image acquired by the image acquisition unit 357 and indexes for the plurality of parts created by the analysis unit 358 so that the image and the indexes are associated.

This enables displaying of a difference in motion among the body parts of the subject (e.g., twisted motion between shoulder and waist) as well, and so a measurement result can be presented more effectively.

The image creation unit 359 makes the output unit 319 display intermittent images in time series among the images acquired by the image acquisition unit 357 and an index created by the analysis unit 358 so that the image and the index are associated.

This can lower the processing load to create an analysis result, and so the analysis result can be presented at earlier timing.

The image creation unit 359 displays an index in a transparent manner.

This enables the display of the index indicating a three-dimensional motion of the subject while keeping the visibility of the moving image of the subject.

The image creation unit 359 displays an image as a guide of the motion of the subject, and changes the transparence rate of the index in accordance with the degree of overlapping between the motion of the subject and the image as the guide.

This enables the display of the index in a more effective manner when the index is displayed with the guide of the motion of the subject.

The image creation unit 359 displays the axis shown in a fixed manner relative to the motion of the index.

This enables the display of the translation, for example, of the subject also, and this leads to easy understanding of the body motion of the subject.

The present invention is not limited to the above exemplary embodiment, but may include any modification and improvement as long as such modification and improvement are compatible with an object of the invention.

In the above embodiment, when the processor 3 displays a simple display image, the processor may estimate the total time required to acquire moving image from the imaging device 2 and create the analysis-result moving image, divide the estimated time by the number of the simple display images, and display the simple display images sequentially. This allows matching of the display content of the image display images with the display starting timing of the analysis-result moving image, and enables the display of an analysis result in an easy-understanding form.

The above embodiment describes the analysis system S including, but not limited to, the three devices that are the sensor unit 1, the imaging device 2 and the processor 3. For instance, a smartphone having the functions of the sensor unit 1 and the processor 3 may be used, so that the analysis system S may be configured as the device including the sensor unit 1 and the processor 3 integrally.

In the above embodiment, when a temporal change in BOX animation is displayed, some characteristics of the motion, such as a change in acceleration, may be differentiated for displaying in a different color or with an index based on the sensor information acquired by the sensor unit 1. For instance, when the body moves with an acceleration larger than the standard, the body of the measurement subject P may be displayed in red.

In the above embodiment, when BOX animation is displayed at a predetermined position around the image of the measurement subject P as in the display example of the real time mode, the position of the body of the measurement subject P at which the sensor unit 1 is attached may be identified with a leading line or a marker. The BOX animation may be overlapped for displaying at the position of the measurement subject P at which the sensor unit 1 is attached.

In the above embodiment, a determination may be made whether the measurement subject P has performed a swing or not by setting detailed conditions based on the sensor information. For instance, when the rotation angle around the vertical axis is a first angle or more and the rotation is in the taking-back direction, this is determined as the top. When the rotation is the first angular speed or more around the vertical axis from the top, this is determined as the downswing. When the rotation angle around the vertical axis is a second angle or more and the rotation is in the follow-through direction, this is determined as the follow-through. When all of these conditions are satisfied, it is determined that the measurement target performs a swing. Another condition about time may be added to satisfy these conditions. For instance, another condition may be set so that each of these conditions is sequentially satisfied within 2 sec., for example.

In the above embodiment, the timing of predetermined characteristic points in a golf swing is detected based on the sensor information. In this case, such characteristic points may be determined by analyzing time-series data chronologically, or other characteristic points may be determined by making an analysis backward in time using clearly distinguishable timings as the characteristic points.

This allows more reliable detection of the timing for predetermined characteristic points in a golf swing.

In the above embodiment, when the simple display creation unit 360 displays a simple display image, a cancel button may be displayed to cancel the processing to create the data of BOX animation by the analysis unit 358 and to display the analysis-result moving image by the image creation unit 359.

Thereby, when a user who checks the simple display image determines that the creation of an analysis-result moving image is not necessary, such unnecessary processing can be avoided.

In the above embodiment, when the sensor information in the one-shot range acquired in the one-shot mode is transmitted from the sensor unit 1 to the processor 3, the sensor information on the predetermined characteristic points in the golf swing by the measurement subject P is not transmitted first at Step S14 of FIG. 13. Instead, at Step S15 of FIG. 13, the entire sensor information in the one-shot range may be transmitted to the processor 3. In this case, the overall time required to transmit the sensor information can be shortened.

In the above embodiment, the detection processing unit 156 detects a timing of a predetermined characteristic point in the golf swing based on the sensor information acquired at the one-shot mode. For instance, the detection processing unit 156 may analyze the waveform of the sensor information acquired at the one-shot mode to detect the timing when the waveform starts to change from a small amount of change in waveform as the timing of the address. Alternatively, after detecting the range of a swing and detecting the timing of downswing, the timing traced back by a predetermined time from the timing of the downswing may be set again as the timing of the address so as to determine the range of the one shot.

The above embodiment describes an example, but not limited to, in which the measurement subject P performing a golf swing wears the sensor unit 1 and the analysis system S is used to analyze the golf swing. The analysis system S according to the present invention can be used for various types of sports, such as baseball, tennis, and track and field as long as an image of a player as a subject can be taken at a fixed position of the angle of view. For instance, the analysis system S according to the present invention can be used to take an image of a subject, such as a batter who is swinging in a batter's box, a pitcher who is pitching at the mound, a server playing tennis, or a sprinter running while being shot with a camera running in parallel.

The above embodiment describes an example, but not limited, including the processor 3 of the present invention that is a smartphone.

For instance, the present invention can be generally used for an electronic device having an image processing function. Specifically, the present invention can be used for a laptop-type personal computer, a printer, a TV set, a video camera, a portable navigation device, a mobile phone, a portable game device, and the like.

The above-stated series of processing may be executed by hardware or by software.

In other words, the functional configuration of FIGS. 6, 8, and 9 is illustrative, and is not limited particularly. That is, the analysis system S may have a function of executing the above-stated series of processing as a whole, and the functional blocks to implement the function are not limited particularly to the example of FIGS. 6, 8 and 9.

One of the functional blocks may be configured with a single hardware unit or with a single software unit, or may be configured with a combination thereof.

The functional configuration of the present embodiment is implemented by a processor configured to execute the arithmetic processing. Such a processor that can be used in the present embodiment includes various types of processors as a single unit including a single processor, a multiprocessor, and a multicore processor as well as a combination of these various types of processors and a processing circuit, such as ASIC (Application Specific Integrated Circuit) or FPGA (Field Programmable Gate Array).

When a series of processing is executed with software, a program configuring the software may be installed into a computer, for example, via a network or from a recording medium.

The computer may be a computer incorporated into a dedicated hardware. The computer may be a computer capable of executing various types of functions by installing various types of programs in the computer, and may be a general-purpose personal computer, for example.

A recording medium containing such a program may be configured with the removable medium 231, 331 of FIG. 4, 5 that is distributed separately from the main body of the device to provide the program to a user. Alternatively, the recording medium may be provided to a user while being incorporated beforehand into the main body of the device. The removable medium 231, 331 may be configured as a magnetic disk including a floppy disk, an optical disk, an magnetic optical disk or the like. The optical disk may be configured as a CD-ROM (Compact Disk-Read Only Memory), a DVD (Digital Versatile Disk), a Blu-ray (registered trademark), a disc (Blu-ray disc) or the like. The magnetic optical disk may be configured as a MD (Mini-Disk) or the like. The recording medium that is provided to a user while being incorporated beforehand into the main body of the device may be configured as the ROM 112, 212, 312 of FIGS. 3 to 5 containing a program, the hard disk included in the storage unit 119, 219, 320 of FIGS. 3 to 5, or the like.

In the present specification, the steps to describe the programs recorded on the recording medium include the processing that is performed in a time series manner according to the recorded order. The processing is not necessarily performed in a time series manner, and the steps also include the processing that is performed in a parallel or an independent manner.

In the present specification, the term of system means an entire device including a plurality of devices and a plurality of means.

That is the description of some embodiments of the present invention. These embodiments are just illustrative, and the technical scope of the present invention is not limited to those examples. The present invention can be in the form of other various embodiments, and may include any modifications such as omission and substitution without departing from the scope of the present invention. The scope and the spirit of the invention described in the present specification as well as the accompanying claims and their equivalents cover these embodiments and modifications thereof.

What is claimed is:

1. An image processing apparatus, comprising:
a memory on which a program is stored; and
a processor which, under control of the program stored in the memory, executes processes comprising:
selecting a subject motion mode from among a plurality of predetermined subject motion modes;
acquiring a taken image of a subject at a predetermined imaging rate determined based on the selected subject motion mode;
acquiring a measurement result of a motion of the subject measured with a sensor at a predetermined sampling rate determined based on the selected subject motion mode;
creating a solid polygon image indicating the motion of the subject based on the acquired measurement result, wherein at least one aspect of the solid polygon image faces toward at least one of a front-back direction, a right-left direction, and a vertical direction of the subject; and
controlling a display to display the acquired taken image of the subject together with the created solid polygon image,
wherein the plurality of predetermined subject motion modes include (i) a first mode in which imaging of the subject is started based on an acquisition start timing of the acquired measurement result and (ii) a second mode in which, when the start of a predetermined motion is detected from the acquired measurement result while in the first mode, recording of an image of the subject is started.

2. The image processing apparatus according to claim 1, wherein the solid polygon image indicates a three-dimensional motion of the subject.

3. The image processing apparatus according to claim 1, wherein the solid polygon image comprises a stereoscopic box image.

4. The image processing apparatus according to claim 1, wherein the sensor comprises a sensor worn by the subject.

5. The image processing apparatus according to claim 1, wherein the acquired taken image of the subject is an image taken with an imaging device.

6. The image processing apparatus according to claim 1, wherein the controlling overlaps the created solid polygon image on the subject in the acquired taken image.

7. The image processing apparatus according to claim 6, wherein the controlling overlaps the created solid polygon image on the subject in the acquired taken image at a position corresponding to a body part of the subject subjected to measurement by the sensor.

8. The image processing apparatus according to claim 1, wherein the controlling displays the created solid polygon image around the subject in the acquired taken image.

9. The image processing apparatus according to claim 8, wherein the controlling displays the created solid polygon image around the subject in the acquired taken image at a position associated with a body unit of the subject subjected to measurement by the sensor.

10. The image processing apparatus according to claim 1, wherein:
the acquiring the measurement result comprises acquiring a measurement result of a motion of the subject at a plurality of parts of the subject measured with sensors,
the creating comprises creating a plurality of solid polygon images, each of the solid polygon images being created with respect to a respective one of the plurality of parts of the subject, and
the controlling associates (i) the acquired taken image and (ii) the created solid polygon images, and controls the display to display the acquired taken image and the created solid polygon images having been associated.

11. The image processing apparatus according to claim 1, wherein the controlling associates (i) intermittent images acquired in a time series and (ii) the solid polygon image created for each of the intermittent images, and controls the display to display the intermittent images and the created solid polygon images having been associated.

12. The image processing apparatus according to claim 1, wherein the controlling displays the created solid polygon image in a transparent manner.

13. The image processing apparatus according to claim 1, wherein the controlling displays an image as a guide of the motion of the subject, and changes a transparence rate of the created solid polygon image in accordance with a degree of overlapping between the subject and the image as the guide.

14. The image processing apparatus according to claim 1, wherein the controlling further displays an axis that is fixed relative to a motion of the created solid polygon image.

15. The image processing apparatus according to claim 1, wherein the predetermined imaging rate and the predetermined sampling rate in the first mode differ from the predetermined imaging rate and the predetermined sampling rate in the second mode.

16. The image processing apparatus according to claim 15, wherein the predetermined imaging rate and the predetermined sampling rate in the second mode are higher than the predetermined imaging rate and the predetermined sampling rate in the first mode.

17. The image processing apparatus according to claim 16, wherein the predetermined imaging rate and the predetermined sampling rate in the first mode are set at a same first rate, and the predetermined imaging rate and the predetermined sampling rate in the second mode are set at a same second rate higher than the first rate.

18. An analysis system comprising:
an imaging device including an imaging unit to take an image of a subject;
a detection device attached to the subject, the detection device including a sensor to measure a motion of the subject;
a memory on which a program is stored; and
a processor which, under control of the program stored in the memory, executes processes comprising:
selecting a subject motion mode from among a plurality of predetermined subject motion modes;
acquiring, from the imaging device, a taken image of the subject, the taken image of the subject being acquired at a predetermined imaging rate determined based on the selected subject motion mode;
acquiring, from the detection device, a measurement result of a motion of the subject measured with the sensor, the acquired measurement result being acquired at a predetermined sampling rate determined based on the selected subject motion mode;
creating a solid polygon image indicating the motion of the subject based on the acquired measurement result, wherein at least one aspect of the solid polygon image faces toward at least one of a front-back direction, a right-left direction, and a vertical direction of the subject; and
controlling a display to display the acquired taken image of the subject together with the created solid polygon image,
wherein the plurality of predetermined subject motion modes include (i) a first mode in which imaging of the subject is started based on an acquisition start timing of the acquired measurement result and (ii) a second mode in which, when the start of a predetermined motion is detected from the acquired measurement result while in the first mode, recording of an image of the subject is started.

19. A method for processing an image, the method being executed by an image processing apparatus, and the method comprising:
selecting a subject motion mode from among a plurality of predetermined subject motion modes;
acquiring a taken image of a subject at a predetermined imaging rate determined based on the selected subject motion mode;
acquiring a measurement result of a motion of the subject measured with a sensor at a predetermined sampling rate determined based on the selected subject motion mode;
creating a solid polygon image indicating the motion of the subject based on the acquired measurement result, wherein at least one aspect of the solid polygon image faces toward at least one of a front-back direction, a right-left direction, and a vertical direction of the subject; and
controlling a display to display the acquired taken image of the subject together with the created solid polygon image,
wherein the plurality of predetermined subject motion modes include (i) a first mode in which imaging of the subject is started based on an acquisition start timing of the acquired measurement result and (ii) a second mode in which, when the start of a predetermined motion is detected from the acquired measurement result while in the first mode, recording of an image of the subject is started.

20. A non-transitory computer-readable recording medium having a program recorded thereon, the program being executable by a processor to control the processor to execute processes comprising:

selecting a subject motion mode from among a plurality of predetermined subject motion modes;

acquiring a taken image of a subject at a predetermined imaging rate determined based on the selected subject motion mode;

acquiring a measurement result of a motion of the subject measured with a sensor at a predetermined sampling rate determined based on the selected subject motion mode;

creating a solid polygon image indicating the motion of the subject based on the acquired measurement result, wherein at least one aspect of the solid polygon image faces toward at least one of a front-back direction, a right-left direction, and a vertical direction of the subject; and controlling a display to display the acquired taken image of the subject together with the created solid polygon image, wherein the plurality of predetermined subject motion modes include (i) a first mode in which imaging of the subject is started based on an acquisition start timing of the acquired measurement result and (ii) a second mode in which, when the start of a predetermined motion is detected from the acquired measurement result while in the first mode, recording of an image of the subject is started.

* * * * *